United States Patent [19]

Zubillaga et al.

[11] Patent Number: 5,613,636
[45] Date of Patent: Mar. 25, 1997

[54] AXISYMMETRIC NOZZLES OF VARIABLE GEOMETRY AND ORIENTATION OF THE FLOW WHICH ARE INTENDED FOR GAS TURBINE ENGINES

[75] Inventors: Mikel G. Zubillaga, Hernani; Jose R. Urruela, Las Arenas, both of Spain

[73] Assignee: Sener, Ingenieria Y Sistemas, S.A., Spain

[21] Appl. No.: 319,288

[22] Filed: Oct. 6, 1994

[30] Foreign Application Priority Data

May 20, 1994 [ES] Spain ..................................... 9401114

[51] Int. Cl.$^6$ ..................................... B64C 15/00
[52] U.S. Cl. .................. 239/265.35; 239/265.41
[58] Field of Search ..................... 239/265.33, 265.35, 239/265.39, 265.41; 60/228, 232

[56] References Cited

U.S. PATENT DOCUMENTS

| | | | |
|---|---|---|---|
| 3,954,225 | 5/1976 | Camboulivres et al. | 239/265.4 |
| 4,994,660 | 2/1991 | Hauer | 239/265.41 |
| 5,174,502 | 12/1992 | Lippmeier et al. | 239/265.41 |
| 5,285,637 | 2/1994 | Barcza | 239/265.41 |
| 5,398,499 | 3/1995 | Urruela | 239/265.35 |

FOREIGN PATENT DOCUMENTS 1225736  2/1960  France ................ 239/265.41

*Primary Examiner*—Kevin Weldon
*Attorney, Agent, or Firm*—Ostrolenk, Faber, Gerb & Soffen, LLP

[57] ABSTRACT

Improvements in orientable axisymmetric nozzles of variable geometry which are intended for gas turbine engines, which nozzles comprise a convergent zone (2) followed by a divergent zone (3), both formed by main petals (4–5) and secondary petals (33–34), and they add to the known functions (simultaneous axisymmetric variation, according to a preestablished law, of the throat area A8 and of the outlet area A9; variation of all the geometry of the outlet area A9 independently of the throat area A8; and, axisymmetric orientation of the flow) a fourth function of varying only a part of the geometry of the outlet area A9 independently of the throat area A8.

35 Claims, 30 Drawing Sheets

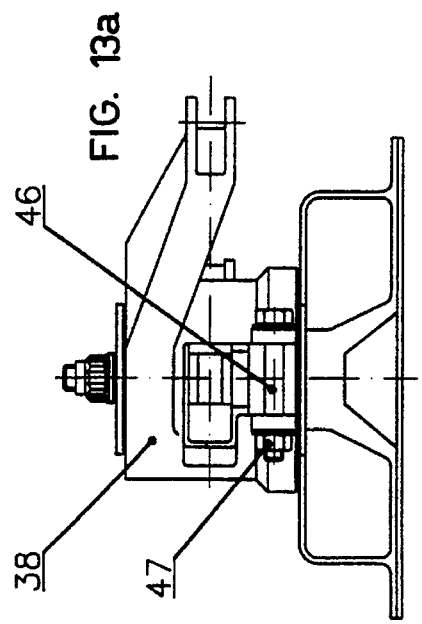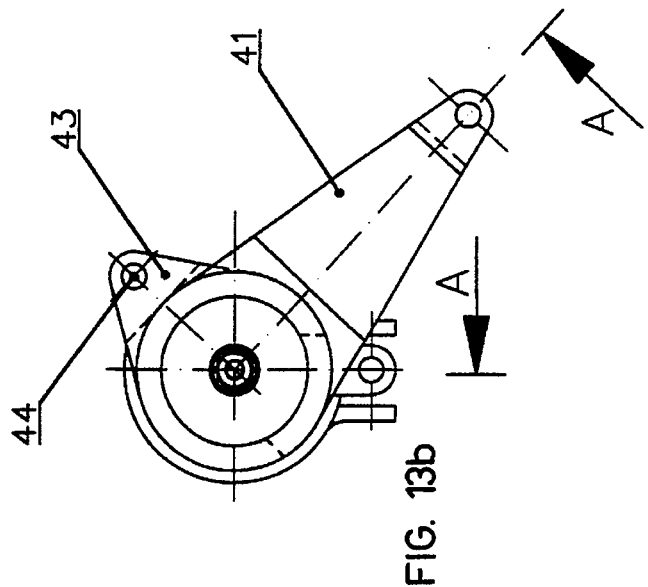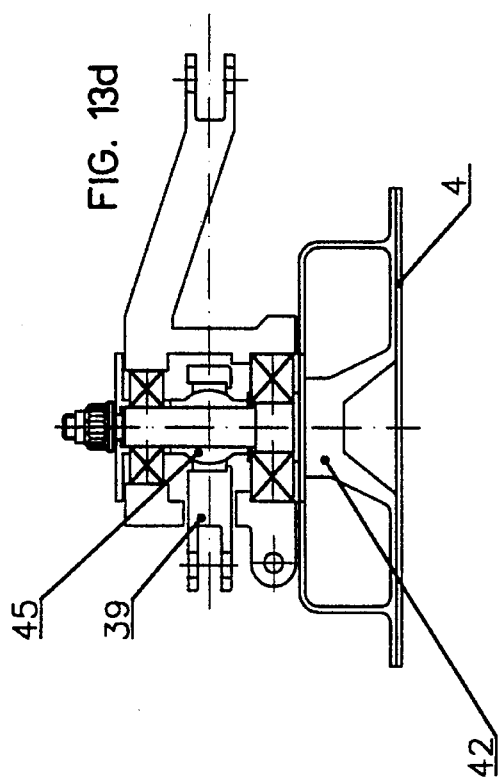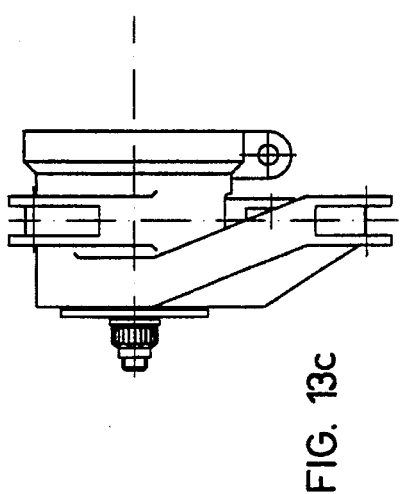

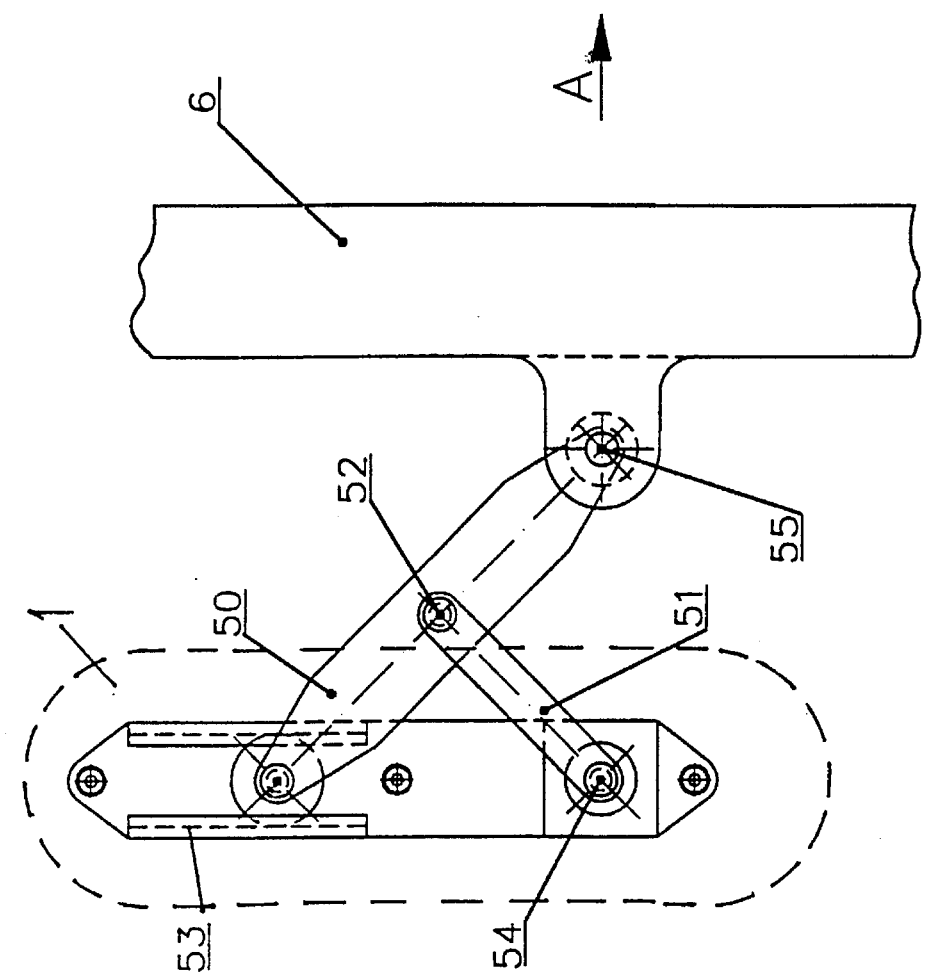
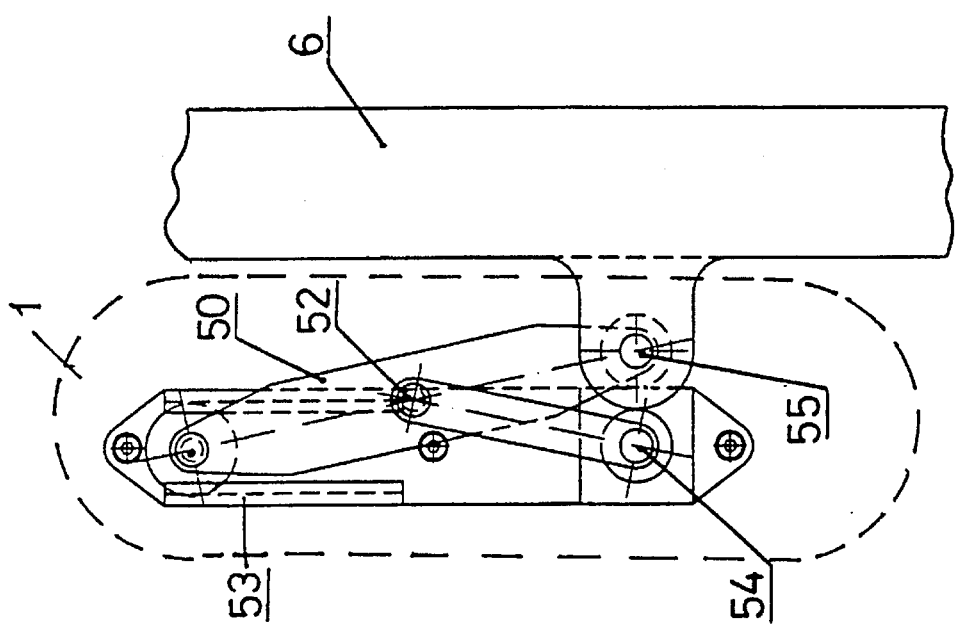
FIG. 14

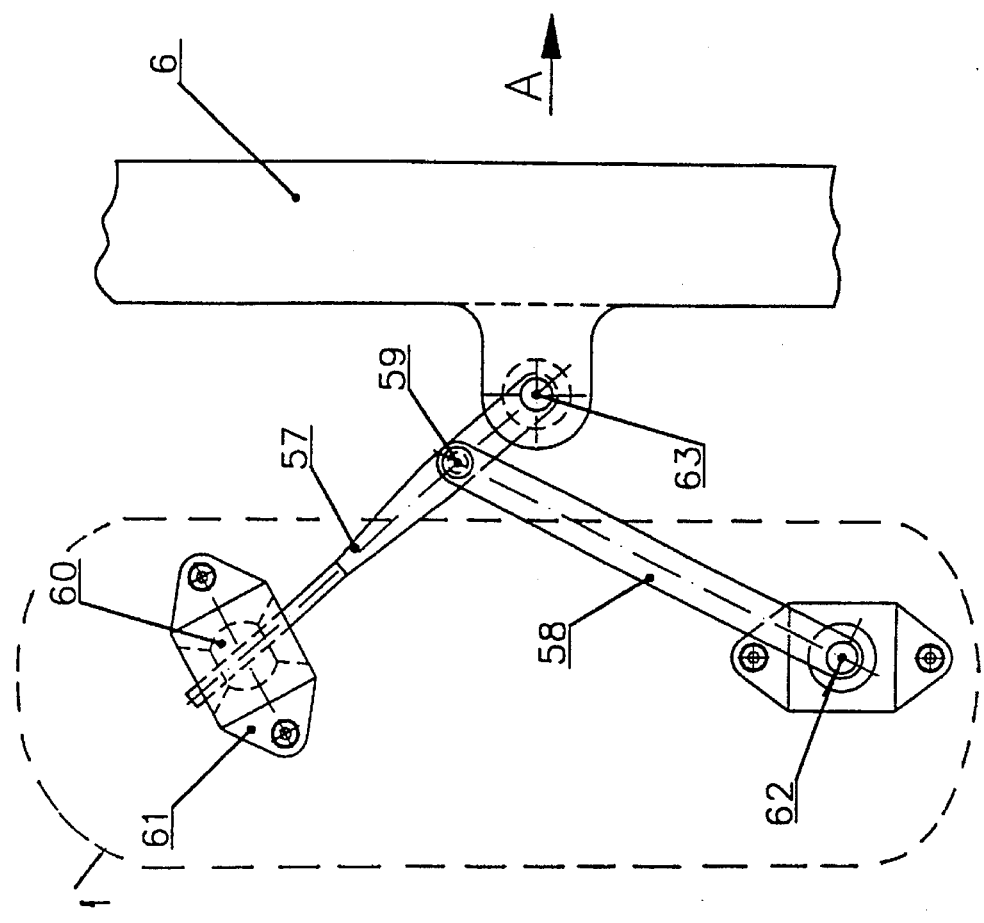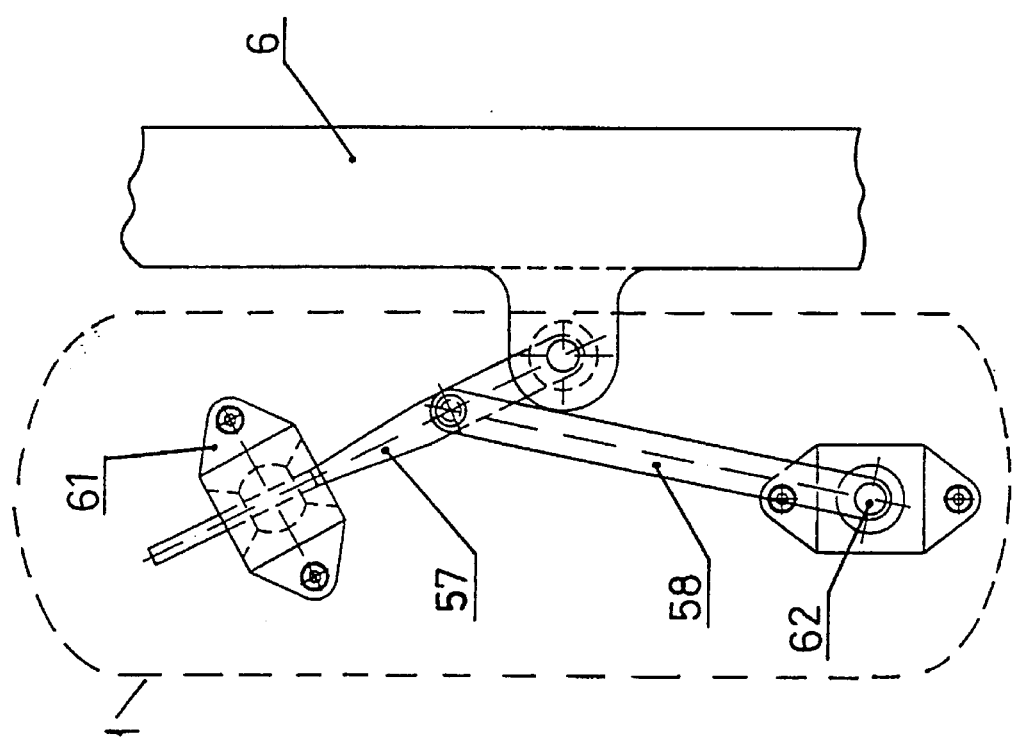
FIG. 17

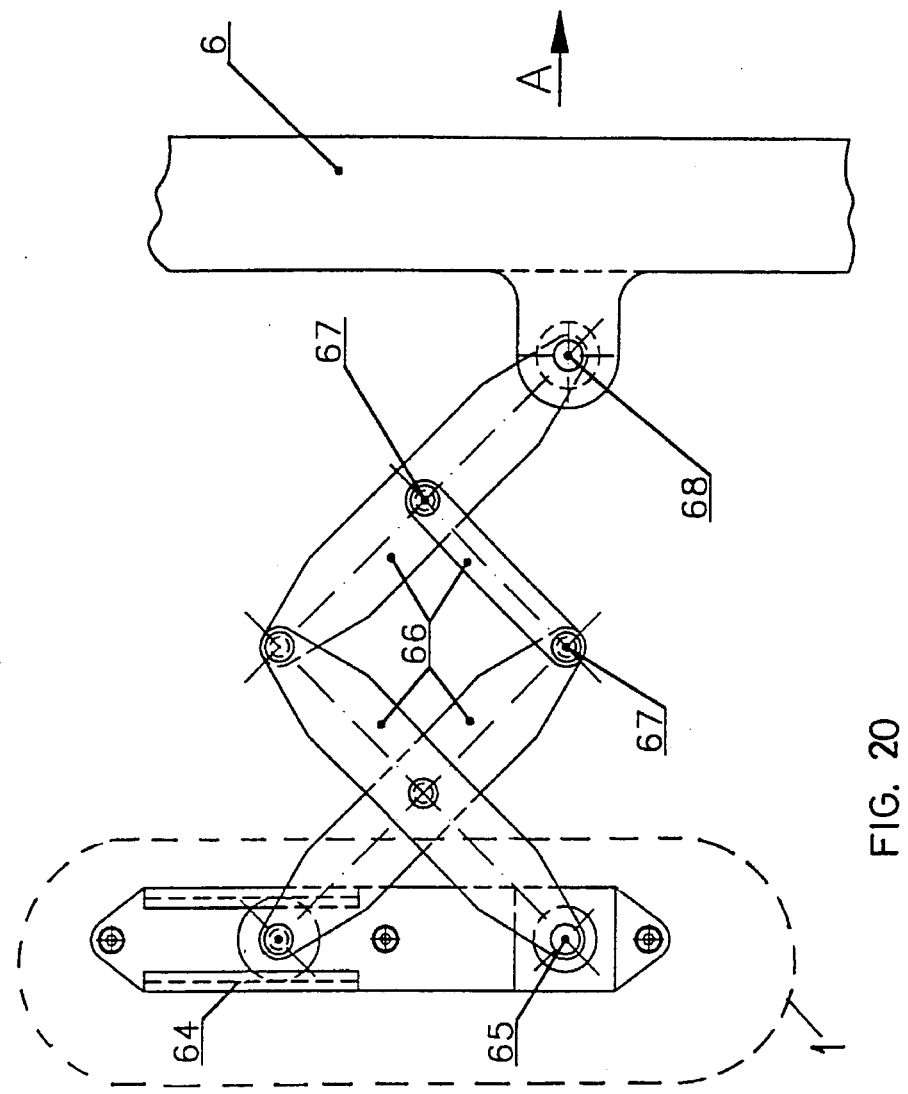
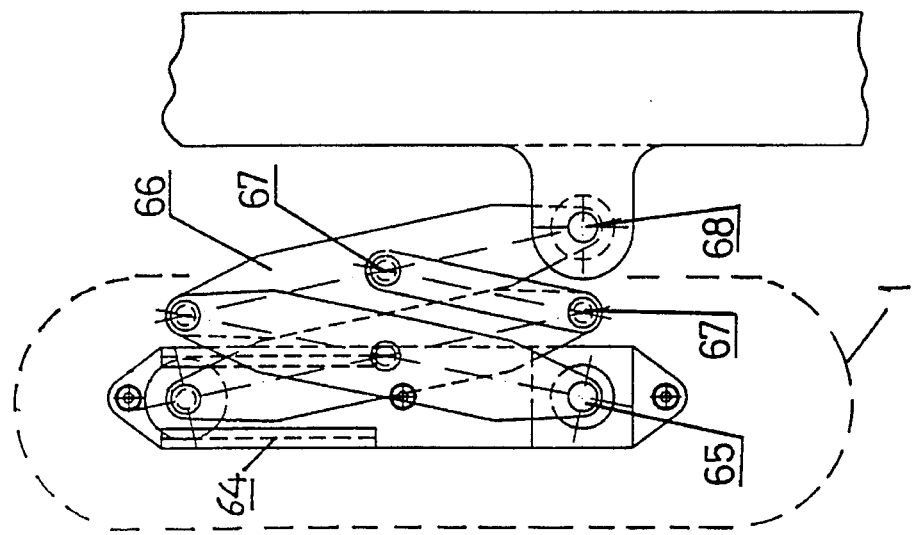
FIG. 20

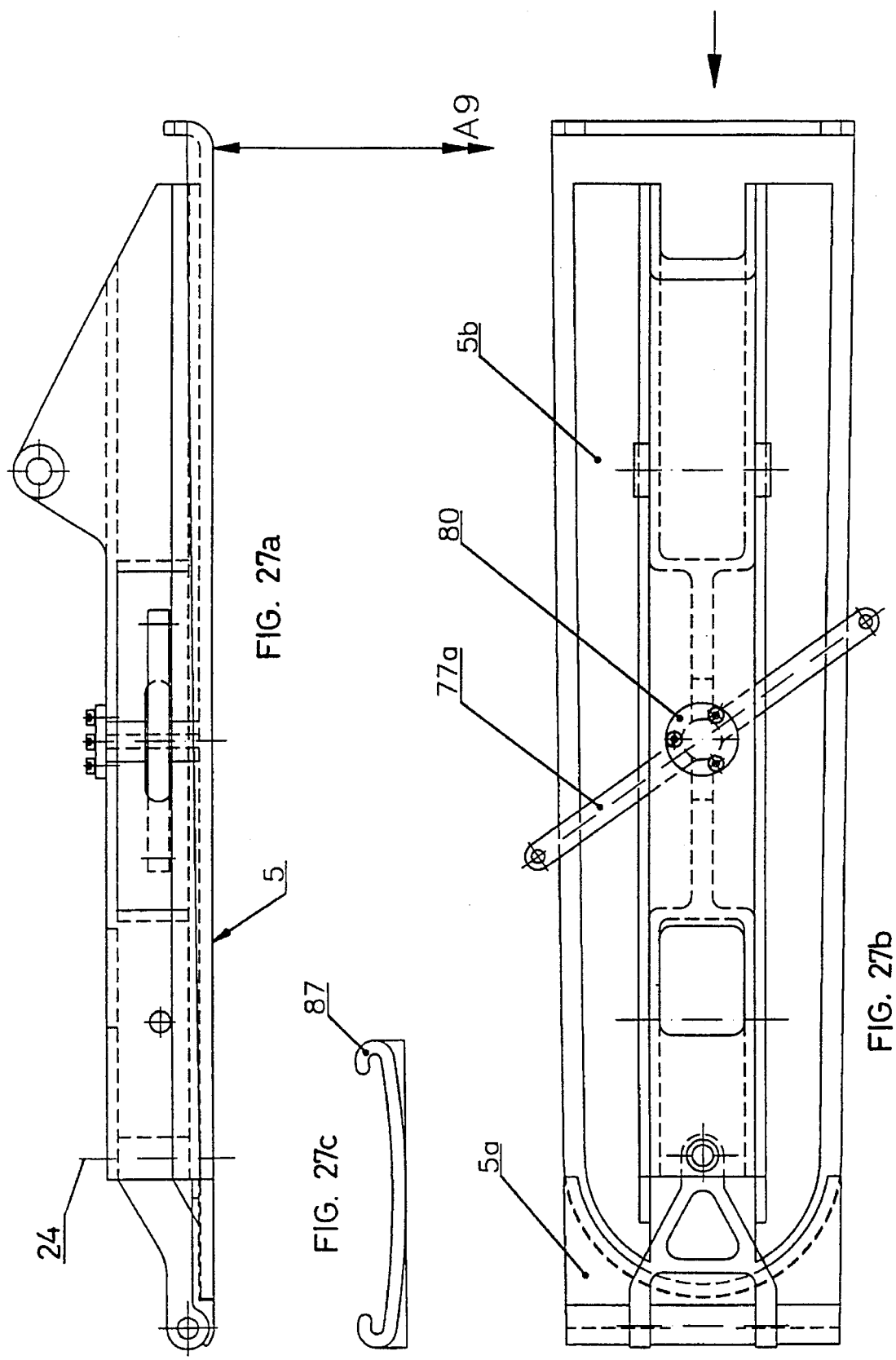

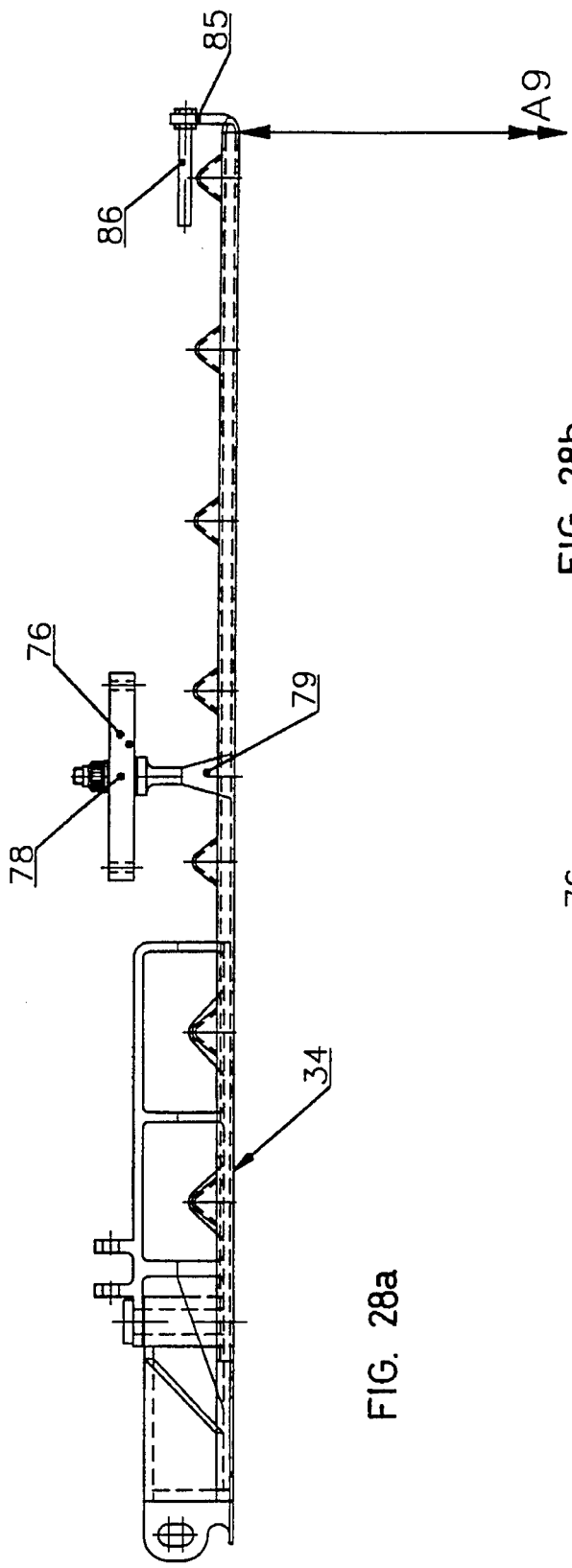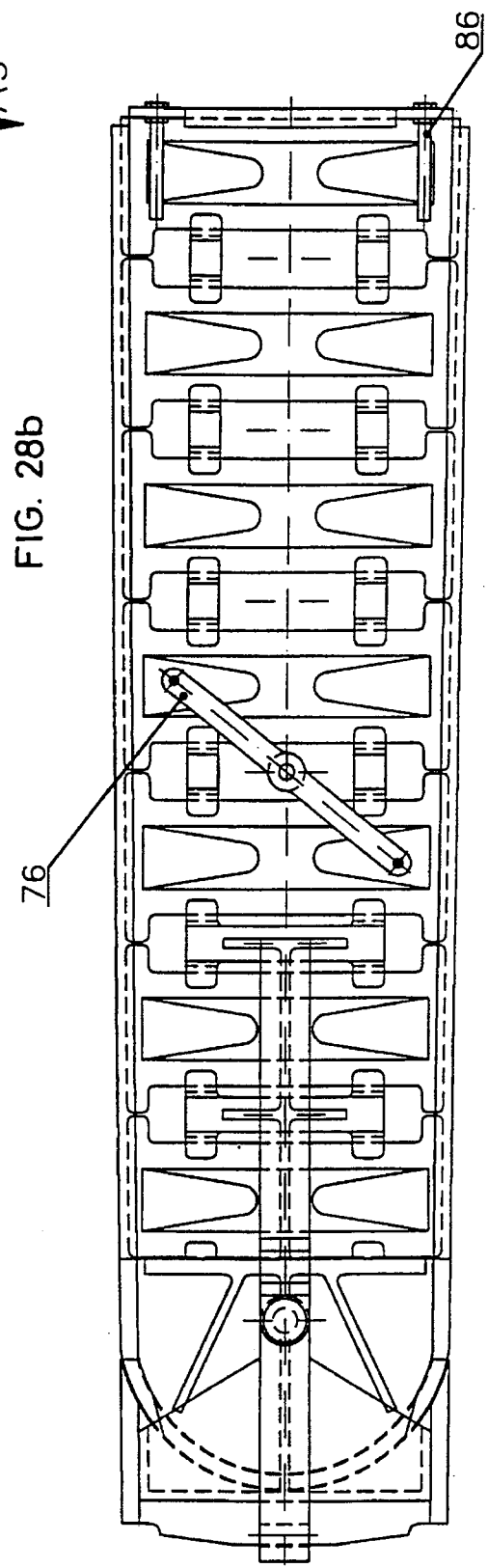
FIG. 28a
FIG. 28b

AXISYMMETRIC NOZZLES OF VARIABLE GEOMETRY AND ORIENTATION OF THE FLOW WHICH ARE INTENDED FOR GAS TURBINE ENGINES

FIELD OF THE INVENTION

The present invention relates to a convergent/divergent nozzle, of variable geometry and with the capacity to orient the flow of gas, for a gas turbine engine used as a means of propulsion in aviation.

More specifically, in a preferred application, the nozzle referred to in this invention is of the axisymmetric type, including a convergent zone followed, in the direction of the flow, by a divergent zone, both formed by main petals, distributed circumferentially about the longitudinal axis of the engine and connected together by means of articulations, and by secondary petals which are also connected together by means of articulations and distributed circumferentially about the longitudinal axis of the engine, which convergent zone defines a throat of variable area and which divergent zone, also of variable geometry, may be actuated in order to orient the flow of gas, and therefore the thrust, in any direction over a cone located about the longitudinal axis of the engine.

BACKGROUND OF THE INVENTION

In this nozzle, unlike U.S. Pat. No. 4,994,660, published on 2.19.91, only a part of the divergent zone of the nozzle is oriented, downstream of the throat area A8, and it has the advantage of simplifying sealing between the two zones mentioned, in accordance with Spanish Patent No. 9200369, of Feb. 20, 1992.

Nevertheless, there is a problem of sealing between divergent main petals during the orientation of the flow. There are various solutions for solving the sealing of gaps between divergent main petals, such as those mentioned in U.S. Pat. No. 4,690,330, published on Sep. 1 1987, U.S. Pat. No. 4,662,566, published on May. 5, 1987. U.S. Pat. No. 5,039,014, published on Aug. 13 1991 and U.S. Pat. No. 5,076,496, published on Dec. 31, 1991, and in Spanish Patent and Patent Applications No. 9200369, of 1992, No. 9202157, of 1992, and No. 9301991, of 1993.

Moreover, Spanish Patent Application No. 9301515, of 1993, mentions the embodiment of a peripheral mechanism for regulating the throat area A8, which consists, unlike the peripheral mechanism in U.S. Pat. No. 3,760,436, published on May. 1, 1973, of an assembly of only one link rod, a crank having only two arms and one link rod bar for each convergent main petal.

Spanish Patent No. 9200369, of 1992, claims an orientable axisymmetric nozzle of variable geometry for gas turbine engines. The nozzle consists of a convergent zone and a divergent zone, both formed by main petals and secondary petals distributed circumferentially about the longitudinal axis of the engine, and which includes means of control and external radial support, for regulating the throat area, and means of control for orientation of the flow, being defined in that the regulating of the throat area A8 and the orientation of the flow are achieved by means of a single control system.

This single control system consists, in one of the embodiments, in combination, of two rings, each having a single body, called the internal and intermediate half-rings and of two double-jointed half-rings, called external ring segments the components of said combination of rings being mutually concentric and concentric with the longitudinal axis of the engine, and of a mechanism for regulating the throat area, and of a plurality of control actuators articulated by their upstream end to the fixed structure of the engine.

In the one embodiment, the internal and the intermediate rings and the external ring segments are mutually connected by two pairs of spindles, one pair perpendicular to the other pair, and one of the pair of spindles connecting the intermediate ring to the internal rind, and the other pair of spindles connecting the intermediate ring to the articulated ends of the external ring segments, in which the regulating of the throat area is achieved by axial displacement of the assembly of rings and external ring segments, and in which the variation of the outlet area with respect to an immobilized throat area is achieved by a simultaneous and opposite direction tilting of the two external ring segments, and in which the thrust segments, and in which the thrust vectoring is achieved by a simultaneous and same direction tilting of the two external ring segments with the centers of tilting on the longitudinal axis of the engine.

The convergent main petals are connected at their upstream end to the internal ring, by cylindrical articulations tangential to a theoretical circumference concentric with the longitudinal axis of the engine and located in a theoretical plane perpendicular to said longitudinal axis of the engine. The external ring segments and the pair of spindles which interarticulates them; are joined, for their part, by of ball-and-socket joints, to the downstream end of the above-mentioned control actuators.

The mechanism for regulating the throat area A8, in one of the embodiments mentioned in said Spanish Pat. No. 9200369, of 1992, consists, for each convergent main petal, of a link rod articulated to the fixed structure of the engine and to said convergent main petal.

The upstream end of each divergent main petal is joined to the downstream end of the corresponding convergent main petal by a cylindrical articulation, tangential to a theoretical circumference concentric with longitudinal axis of the engine and located in a theoretical plane perpendicular to said longitudinal axis of the engine.

Each main petal of the divergent zone is subdivided transversely into two segments which are connected together by and the of a cylindrical articulation having the axis perpendicular to the axis of the said articulation between this divergent main petal and its upstream convergent main petal, the downstream segments in said Spanish Patent No. 9200369 being connected to the corresponding external ring segment by a bar which is joined to said segment by a ball-and-socket joint, and to the corresponding external segment ring, a third cylindrical articulation, tangential to a theoretical circumference concentric with the longitudinal axis of the engine and located in a theoretical plane perpendicular to said longitudinal axis of the engine.

Spanish Patent Application No. 9202157, of 1992, describes and claims a design for a divergent secondary petal for sealing the longitudinal gap between contiguous divergent main petals. The geometry of said longitudinal gaps between divergent main petals alters during the orientation of the flow, changing from an approximately rectangular form to that of a regulated surface whose sides are no longer parallel.

Said Spanish Patent Application No. 9202157 proposes converting every divergent secondary petal into a deformable structural assembly with minimal torsional rigidity, composed of a base plate and of a plurality of discrete transverse elements inserted into said base plate. This base plate gives the assembly axial rigidity, acting as an element bearing the axial forces due to the flow of gas the cooling air and the inertia forces, exhibiting, however, minimum capacity for transmitting transverse and torsional forces. For their part, the discrete transverse elements lack the capacity to transmit torsional forces, and transmit the transverse and shear forces imposed both by the flow of gas and by the divergent main petals to which is transmitted the pressure of gas exerted on the base plate bearing the axial forces.

In this manner, Spanish Patent No. 9200369 and Spanish Patent Application No. 9202157, of 1992, offer a mechanism capable of orienting the flow of gas acting solely on one part of the nozzle and of adequate sealing of the transverse gap between zones and of the longitudinal gaps between contiguous divergent main petals. Spanish Patent Application No. 9301991, of 1993, describes and claims a divergent main petal which makes it possible to increase the maximum angle of orientation of the flow with respect to that which it is possible to achieve with the embodiments mentioned in Spanish Patent No. 9200369 and in Spanish Patent Application No. 9202157.

Upon orienting a part of the divergent zone of the nozzle, the divergent main petals, as described in Spanish Patent No. 9200369, are forced to move in the radial direction and their downstream segment in the tangential direction with respect to the longitudinal axis of the engine, the maximum angle of orientation of said part of the divergent zone for a given throat area $A8$ being limited by the interference between main and secondary petals in zones close to the outlet area $A9$. As indicated above, Spanish Patent Application No. 9202157, of 1992, proposes converting the divergent secondary petal into a deformable structural assembly with minimal torsional rigidity, composed of a base plate bearing the axial forces and with minimum capacity for transmitting the transverse forces and discrete transverse elements with the capacity to transmit the transverse and shear forces imposed both by the flow of gas and by the divergent main petals. If the inner surface, in contact with the flow of gas, of the divergent main petals is planar, the maximum angle of orientation of the flow is determined by the interference in zones close to the outlet area $A9$ of said inner surface with the discrete transverse elements since, in this case, the longitudinal edges of the base plate do not bear on the inner surface of the divergent main petals, a longitudinal aperture appearing, which permits the gases to pass outside.

In order to solve the above problem, Spanish Patent Application No. 9301991 proposes a divergent main petal which has an inner surface, in contact with the flow of gases, of variable form between two transverse sections, one of them straight, coincident with or close to the upstream far transverse edge of the petal, and another curved, coincident with or close to the downstream far transverse edge of said petal, having the convexity facing towards the inside of the engine. The transition between both sections is achieved progressively and smoothly in order to permit continuous contact between the divergent secondary petal and said inner surface.

Spanish Patent Application No. 9302455, of 1993, describes and claims a divergent main petal and a novel system for connecting said petal to the corresponding external segment ring. Said connection system consists of two bars, a two hinged bar and an upstream intermediate bar, respectively, which are interlinked by a intermediate cylindrical articulation, the outer end of the two hinged bar is joined to the corresponding external ring by segment a cylindrical articulation, and the inner end of the upstream intermediate bar of is joined, by of a spherical knuckle, to the tangentially moveable downstream segment of the divergent main petal at an intermediate point, at the same time as said intermediate cylindrical articulation is connected to the downstream end of said downstream segment of said divergent main petal by another downstream intermediate bar, having a spherical knuckle in each end.

The invention presented in said Spanish Patent Application No. 9302455 results, during the orientation of the flow, in the tangential movement experienced by the downstream segment of the divergent main petal being defined solely by the two-hinged bar for connection to the corresponding external segment ring, and by the upstream intermediate bar, which, maintaining the connection point of the two-hinged bar and the two intermediate bars, and modifying the longitudinal position of the ball-and-socket joint which links the tangentially moveable downstream segment of the divergent main petal and the upstream intermediate bar, results in it being possible to regulate in the most convenient manner the tangential movement of the downstream segment of the divergent main petal to a fixed radial movement.

Moreover, Spanish Patent Application No. 9301515 mentions the embodiment of a peripheral mechanism for regulating the throat area $A8$ consisting, unlike the peripheral mechanism in U.S. Pat. No. 3,760,436, published on May. 1, 1973, of an assembly having only one link rod, a crank having only two arms and a two-hinged peripheral bar each for each convergent main petal, said link rod being linked, by a ball-and-socket joint, at its upstream end, to the intermediate ring which can be displaced axially without any tilting, and its downstream end to the crank, which is, in turn, joined to the convergent main petal corresponding to it by a cylindrical articulation having an axis perpendicular to the base of said convergent main petal, the ball-and-socket joint joining the link rod and the crank being at a point not located on the axis of said cylindrical articulation,

SUMMARY OF THE INVENTION

The present invention describes and claims a series of improvements, applicable to those axisymmetric nozzles of variable geometry and flow orientation, which are intended for gas turbine engines, which characteristics have been described in the above paragraphs, although such application of said improvements can be extended to any axisymmetric nozzle of variable geometry and flow orientation in which the regulating of the throat and orientation of the flow are achieved by at least a single control system consisting, in combination, of two rings having a single body each, called internal and intermediate rings, and by a ring, called the external ring and being two cylindrically interarticulated external ring segments, the components of said combination of rings being mutually concentric and concentric with the longitudinal axis of the engine, and of a plurality of control actuators articulated by their upstream end to the fixed structure of the engine; which components of said combination are connected together and to the fixed structure of the engine by articulation elements and by support means of the tangential type which permit the axial displacement of at least one of said rings with respect to said fixed structure of the engine, as well as a relative tilting turning movement of at least the external ring of said combination with respect to the internal ring, permitting its inclination with a center of tilting on the longitudinal axis of the engine; which axial displacement of at least one of said rings actuates a mechanism for regulating the throat $A8$; and which convergent secondary petal is centered and supported between adjacent convergent main petals by a conventional support devices; and which divergent secondary sealing petal is centered between the adjacent divergent main petals by a mechanism for centering and support by support devices.

Firstly, a novel function in the above described nozzles is claimed, because, to the known functions (first: simultaneous axisymmetric regulation, according to a prefixed law, of the throat area A8 and of the outlet area A9; second: simultaneous variation of all the geometry of the outlet area A9 independently of the throat area AS; and, third: axisymmetric orientation of the flow), is added a fourth function of simultaneous asymmetric corrections of the geometry of the outlet area A9 independently of the throat area A8. These second, third and new fourth functions are achieved with the new configuration of the external ring constituted by two mutually articulated external ring segments, together with a control system which makes it possible, by only tilting of said external ring segments; Thus, the variation of the outlet area with respect to an immobilized throat area is achieved by a simultaneous and opposite direction tilting of the two external ring segments, and thrust vectoring is achieved by a simultaneous and same direction tilting of the two external ring segments with a center of tilting of the longitudinal axis of the engine, and asymmetric correction of the outlet area, during the vectorization of the gas flow, is achieved by independent tilting of one of the two external ring segments, while the other external ring segment remains immobilized.

The advantages of an axisymmetric nozzle of variable geometry and for orienting the flow equipped with the novel configuration of external ring and with the novel system for actuating the components of said ring include the following:

1. The sole fact of being able to vectorize the divergent petals in individual groups makes it possible to avoid the separations of the inner current of the flow which are produced with large angles of mean orientation of the flow and low pressure relationships which are typical of any landing.

On avoiding said separation, a greater thrust coefficient is achieved without loss of effectiveness of the orientation of the flow, since the energy dissipated in generating the recirculation is used as thrust. In addition, the processes of separation of viscous flows always involve inherent instabilities of not very high frequency which, in a limit case, could be coupled with the natural frequency of the system.

2. Because the geometrical vectorization of part of the petals is smaller, the oriented flow area experienced by the current outside the aircraft is less; in this manner, the separations of said outer current, associated with the orientation of the flow, are of lesser intensity; this results in a reduction in the instabilities of such a current and also in the overall resistance of the aircraft.

3. When approaching landing, the vectorization of the outlet area A9 of the nozzle is downwards. On reducing the vectorization of the petals closest to the ground, a greater distance to the latter in the rear part of the aircraft for one and the same angle of attack is available; this makes it possible to touch down with a greater angle of attack and, therefore, with greater lift Secondly, a peripheral mechanism for varying the throat area A8 is described and claimed, which is or, its equivalent, with lower speed described in Spanish Patent Application No. 9301515: a single link rod, a crank having two arms and a peripheral bar, said link rod being joined by its downstream end to one of said arms of said crank which is mounted in an articulated manner at a pivot which, forming an integral part of said convergent main petal, has its axis perpendicular to the base of said convergent main petal, while the other arm of said crank is connected, by a ball-and-socket joint, to one of the ends of the peripheral bar at the same time as the other end of said peripheral bar is joined by a ball-and-socket joint to the pivot of the adjacent convergent main petal in order to form the assembly of cranks and peripheral bars of all the convergent main petals of a peripheral system which is closed on itself. In the particular case of the axisymmetric nozzle of variable geometry and with orientation of the flow, in which regulations of the throat and vectorization of the thrust are produced by a single control system, the already mentioned link rod of said peripheral mechanism for regulating the throat A8 has its upstream end linked by a ball-and-socket joint to the downstream end of the fixed structure of the engine, unlike Spanish Patent Application No. 9301515; while, in another particular case of the axisymmetric nozzle of variable geometry and with orientation of the flow, in which regulations of the throat and vectorizations of the thrust flow are achieved by two independent control systems (a first one which controls the geometry of the throat area A9 and a second one which tilts the external ring in order to vectorize the thrust), the already mentioned link rod of said peripheral mechanism for regulating the throat A8 has its upstream end linked by a ball-and-socket joint to the downstream end of the non-tilting movable intermediate ring.

In addition, a support means of the tangential type of a non-tilting movable ring by described and claimed, which comprises of at least three hinges having cylindrically interlinked leaves, the downstream leaf being articulated to said ring and the upstream leaf, in its turn, being articulated to the fixed structure of the engine.

Support means of the tangential type for support of the assembly of external ring segments are also described and claimed, which consist of planar systems of articulated bars which do not limit the movements imposed by the plurality of actuators for regulating the throat and for vectorization of the thrust, both with outlet area A9 uncorrected and corrected symmetrically or asymmetrically, each one of said planar systems of articulated bars being linked in an articulated manner via their downstream end to the assembly of the external ring segments, at the same time as it is joined, also in an articulated manner, via its upstream end to the fixed structure of the engine. These planar systems of articulated bars may be embodied as: Desjonges mechanism, articulated Evans-Desjonges quadrilateral with a crank which substitutes for the track in a Desjonges mechanism, conchoidal mechanism, single scissors mechanism or multiple scissors mechanism. In addition, the external ring segments may be supported by a hinge mechanism having three leaves for accommodating an actuator between two of said leaves in a manner similar to that described for the non-tilting movable ring.

A perimetrical mechanism for centering every divergent secondary petal with respect to its adjacent divergent main petals is described and claimed, consisting of three interlinked rocker arms, one of which turns with a cylindrical articulation about a pivot mounted, at a point on the longitudinal axis of symmetry of said divergent secondary petal, in a direction normal to the surface of said secondary petal which is swept by the flow of gas, and each one of the other two rocked arms of which turns in an identical manner with respect to a pivot mounted in an identical manner on one of the two divergent main petals, and the interlinking of rocked arms is achieved by spherical knuckles. These tilted arms of the perimetrical mechanism for centering longitudinal the divergent secondary petals with respect to their adjacent divergent main petals may have flexural rigidity in a plane which is normal to the longitudinal axis of the engine, thus supporting said divergent secondary petals on their adjacent divergent main petals.

Additionally, devices for supporting each divergent secondary petal on its two adjacent divergent main petals are described and claimed, which consist of an assembly of two different devices, one consisting of the already mentioned perimetrical mechanism for centering each divergent secondary petal with respect to its adjacent divergent main petals, the tilt arms of which have flexural rigidity in a plane normal to the longitudinal axis of the engine, and another which, being located outside the outlet area A9, in two extensions of the longitudinal sides of said divergent secondary petal, consists of horns which, with their free ends facing upstream, are parallel to the longitudinal axis of the engine and rest on the curved transverse edge which each divergent main petal has downstream, that is to say on A9.

Similarly, an improvement to the conventional rods for supporting the downstream ends of each convergent secondary petal on its adjacent convergent main petals is described and claimed. This improvement eliminates any excessive vibration of said rod, given the permanent presence of a certain pretension at its join to its fork for fastening to said convergent secondary petal.

Lastly, the location of half of the actuators of the control system on axes parallel to the longitudinal axis of the engine and normal to the circumference formed by the external ring segments is described and claimed, together with the location of the other half in an identical manner on the circumference of the intermediate ring, or the location of a third of the actuators of the control system on axes parallel to the longitudinal axis of the engine and normal to the circumference of the external ring segments, together with the location of the remaining two thirds in an identical manner on the circumference of the intermediate ring.

Other features and advantages of the present invention will become apparent from the following description of the invention which refers to the accompanying drawings.

DESCRIPTION OF THE DRAWINGS

All the characteristics set forth as well as others inherent to the invention, as mentioned in the claims, may be better understood with the following description, given with reference to the attached figures, which show a possible embodiment given by way of non-limiting example, for the particular case of the axisymmetric nozzle of variable geometry with orientation of the flow which is equipped with a single system for regulating the throat area A8, for vectorization of the throat, for symmetric variation of the outlet area A9 and for symmetric correction of the outlet area A9, which has, as a feature peculiar to it: an axially movable internal ring, bearing the upstream ends of each convergent petal; an axially movable and tilting intermediate ring; and at least two external ring segments bearing the upstream ends of the two-hinged bars which support the downstream ends of the divergent main petals.

It should be indicated that, in a general case, each axisymmetric nozzle of variable geometry and with orientation of the flow, in which regulates variation of the throat and vectorization of the thrust are achieved by two independent control systems, has: an internal ring which, bearing the upstream ends of each convergent petal, is linked rigidly to the fixed structure of the engine; a ring moved axially by the actuators of the first control system for regulations the throat area A8; and at least two external ring segments tilted by the actuators of the second control system for vectorization of the thrust and for symmetric variation of the outlet area A9 and for asymmetric correction of the outlet area A9, bearing the upstream ends of the two-hinged bars which support the downstream ends of the divergent main petals. In order to avoid confusion, no graphics reference corresponding to this general case is given, but each component present in one and the other of the cases will have, as reference, one and the same number in the drawings.

In the drawings:

FIG. 1 is a partially cutaway perspective view of an orientable flow nozzle constructed in accordance with the description given and embodiment corresponding to an external ring having two segments supported by multiple scissors mechanisms.

FIG. 1a is a partially cutaway perspective view of an orientable flow nozzle constructed in accordance with the description given and embodiment corresponding to an external ring having two segments supported by hinges having three leaves.

FIG. 2 is a cross section of the nozzle, along the sectional line AA—AA in FIG. 4, to show the links between the various rings and ring segments which, together with the actuators, make up the single control system for regulating the throat area A8, and for vectorization of the thrust, and for symmetric variation of the outlet area A9 and for asymmetric correction of the outlet area A9.

FIG. 3 is also a cross section of the nozzle, along the sectional line BB—BB in FIG. 4, to show the support means of the tangential type, on the fixed structure of the engine, of the various rings and ring segments which, together with the actuators, make up the single control system, according to the embodiment of FIG. 1.

FIG. 4 is a longitudinal half-section of the nozzle along the sectional line CC—CC in FIG. 2, with the nozzle in the closed position and without orientation of the flow.

FIG. 5 is a longitudinal half-section of the nozzle along the sectional line DD—DD in FIG. 2, with the nozzle in the open position and without orientation of the flow.

FIG. 6 is a longitudinal half-section of the nozzle along the sectional line EE—EE in FIG. 2, with the nozzle in the closed position and without orientation of the flow.

FIG. 7 is a longitudinal half-section of the nozzle along the sectional line EE—EE in FIG. 2, with the nozzle in the open position and without orientation of the flow.

FIGS. 8 and 9 are longitudinal sections of the nozzle along the sectional line EE—EE in FIG. 2, with the nozzle in the closed position and open position, respectively, in both cases with orientation of the flow.

FIG. 10 and 11 are rear views of the nozzle, without orientation and with orientation of the flow, respectively, both figures corresponding to geometries of the outlet area A9 without asymmetric correction.

FIG. 12 is a rear view of the peripheral mechanism for regulating the throat area A8 which is the subject of Spanish Patent Application No. 9301515.

FIGS. 13a, 13b and 13c show, in front elevation, a detail of the crank having two arms and of the pivot fixed to the base of the convergent main petal belonging to the peripheral mechanism for regulating varying the throat area A8. FIG. 13d is a section along the sectional line A—A in FIG. 13b.

FIGS. 14 to 23 are diagrams viewed generally perpendicular to the longitudinal arrow A of the engine's gas flow, and arc of the support means of the tangential type of the external ring segments, each one of which shows the means of support in the folded and unfolded positions.

Figure 24:
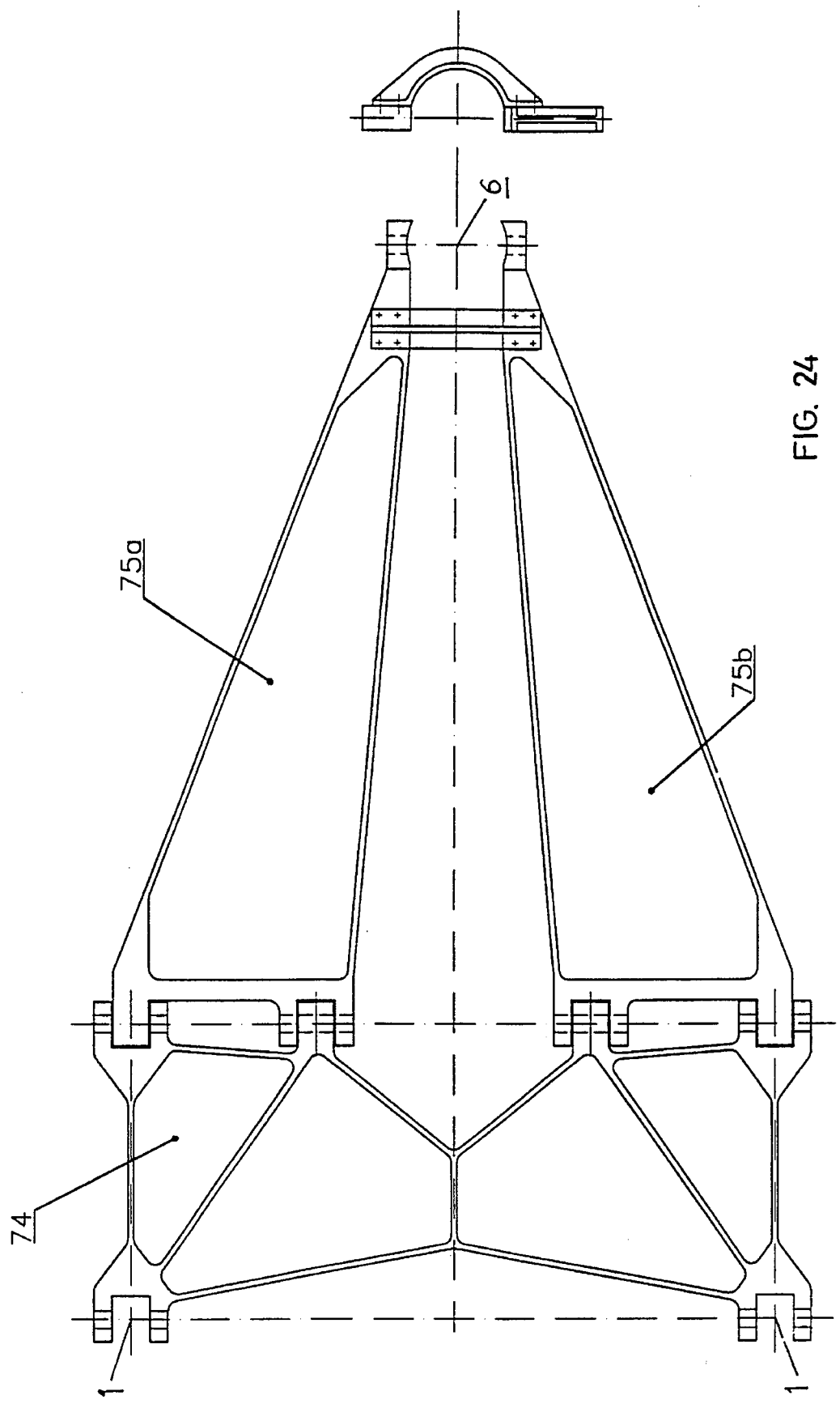

FIG. 24 is a diagram of the hinge mechanism having three leaves of within the support means of the tangential type of the external ring segments.

Figure 25:
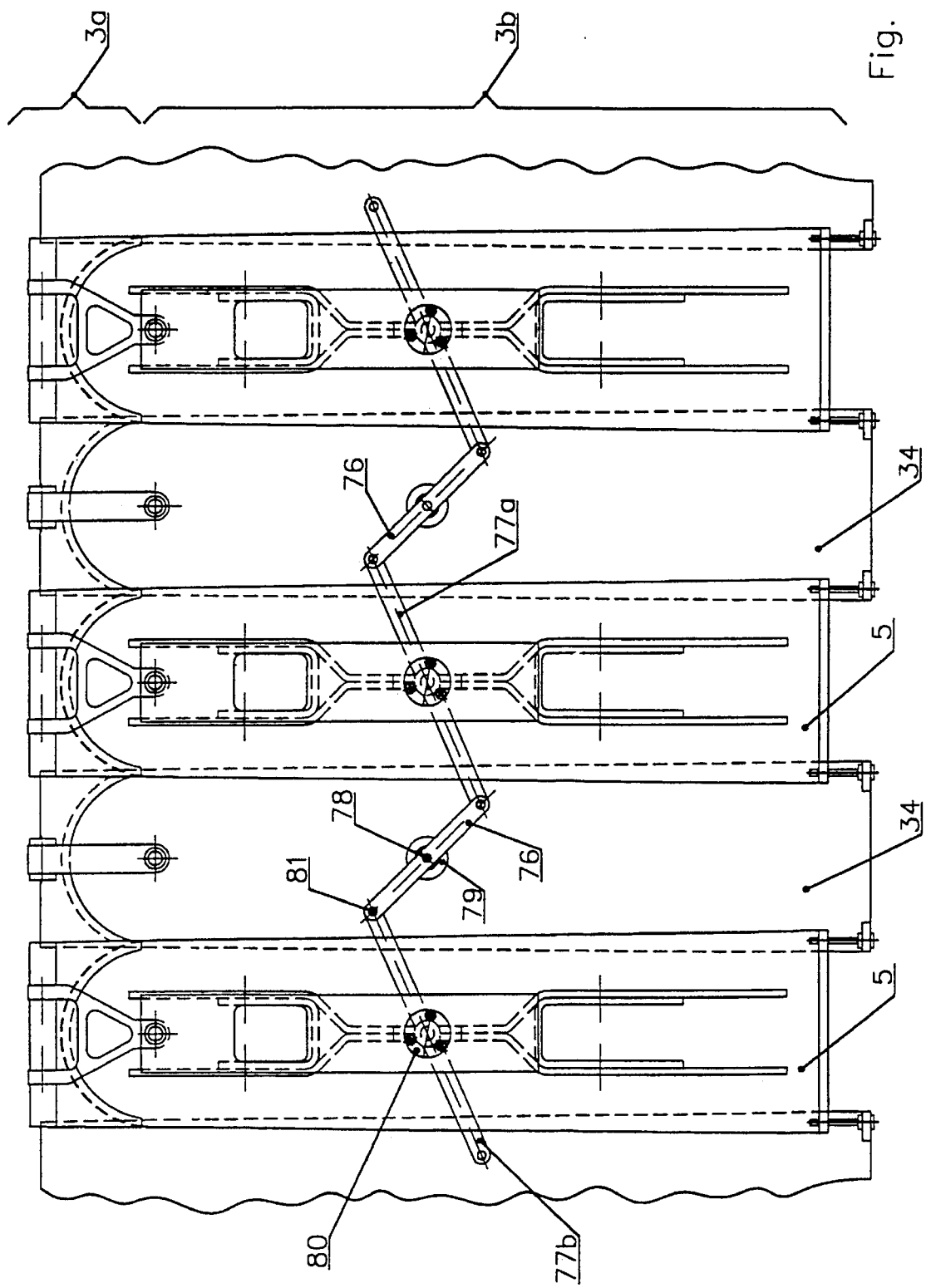
Figure 26:
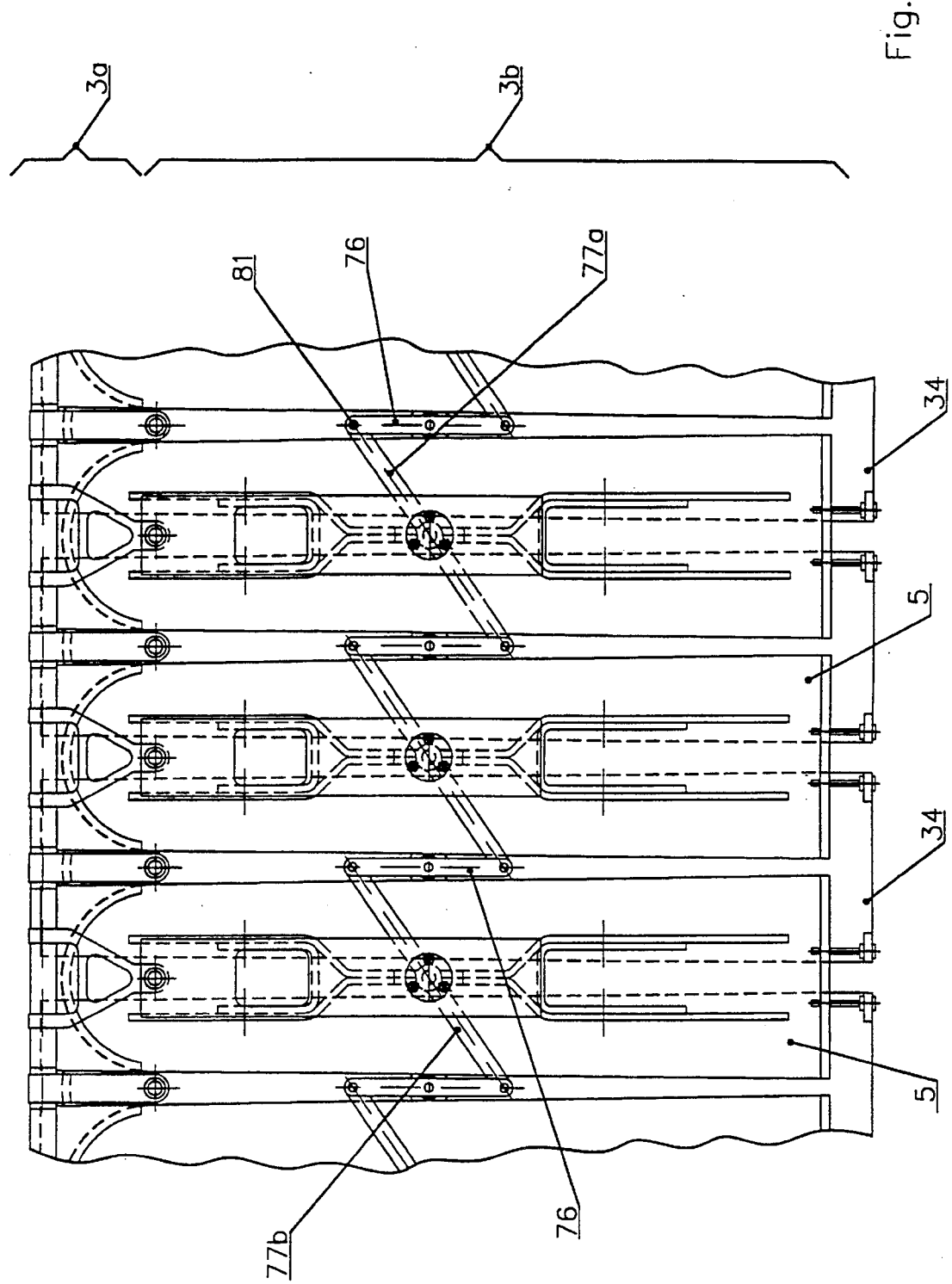

FIGS. 25 and 26 are diagrams of the operation of the mechanism for centering the divergent secondary petals with the nozzle open and closed, respectively, indicating the non-vectorizable part and the vectorizable part.

FIGS. 27a, 27b and 27c show, in lateral elevation, plan view and profile, a detail of the divergent main petal shown in FIGS. 25 and 26 and which corresponds to the divergent main petal which is the subject of Spanish Patent Application No. 9301991, of 1993, which is of variable form between two cross sections, one of them with a straight base and located close to the upstream transverse edge of the divergent main petal and another with a curved base close to the downstream end transverse edge of the petal and with its convexity facing towards the longitudinal axis of the engine.

FIGS. 28a and 28b show, in lateral elevation and plan view, a detail of the divergent secondary petal shown in FIGS. 25 and 26.

FIGS. 29a and 29b show the conventional device for supporting each divergent secondary petal on its two adjacent divergent main petals.

Figure 31:
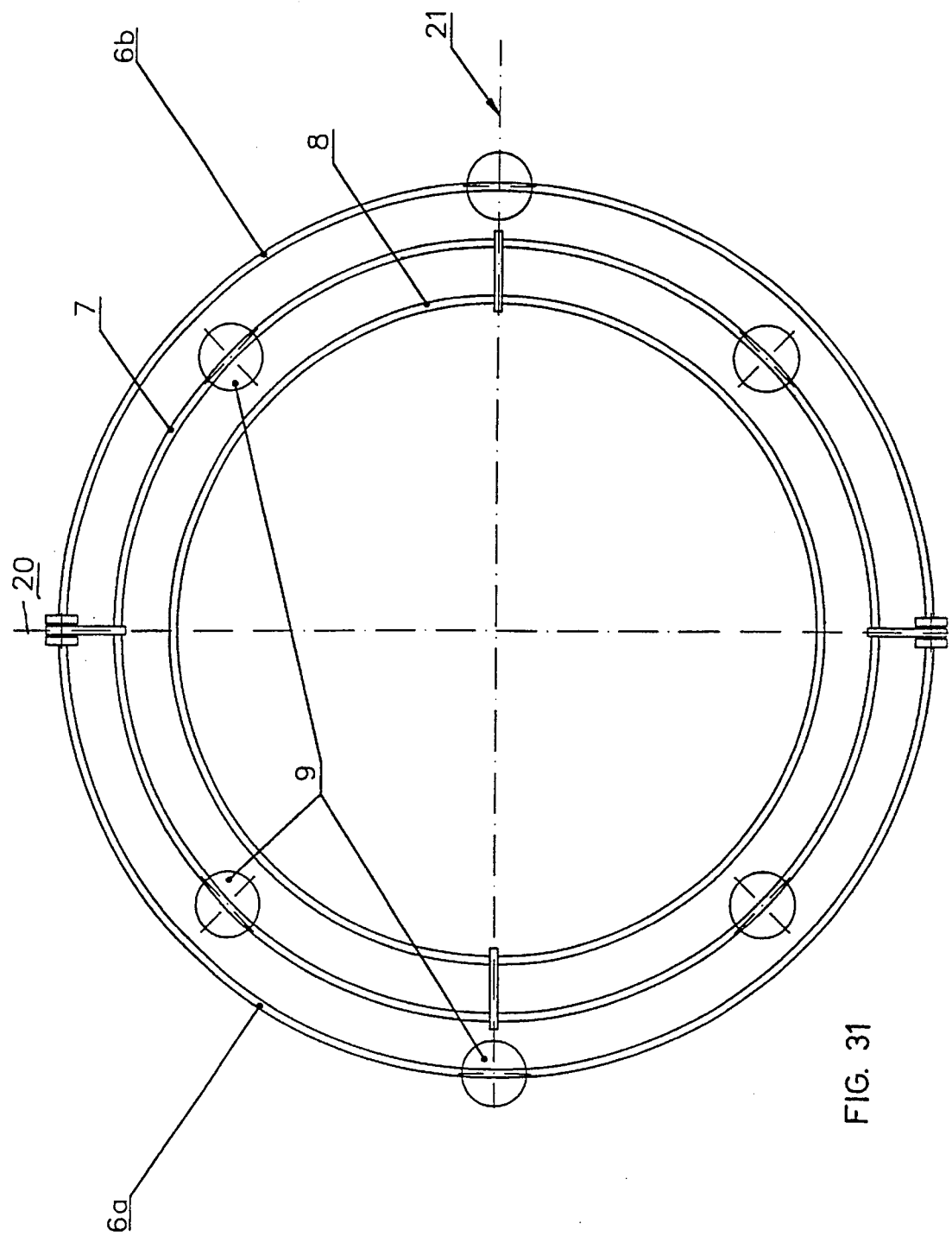

FIGS. 30 and 31 show two embodiments of the location of the actuators, in the case of a single system for regulating the throat area A8, and for vectorization of the thrust, and for symmetric variation of the outlet area A9 and for asymmetric correction of the outlet area A9.

DESCRIPTION OF THE PREFERRED EMBODIMENTS

Figure 1:
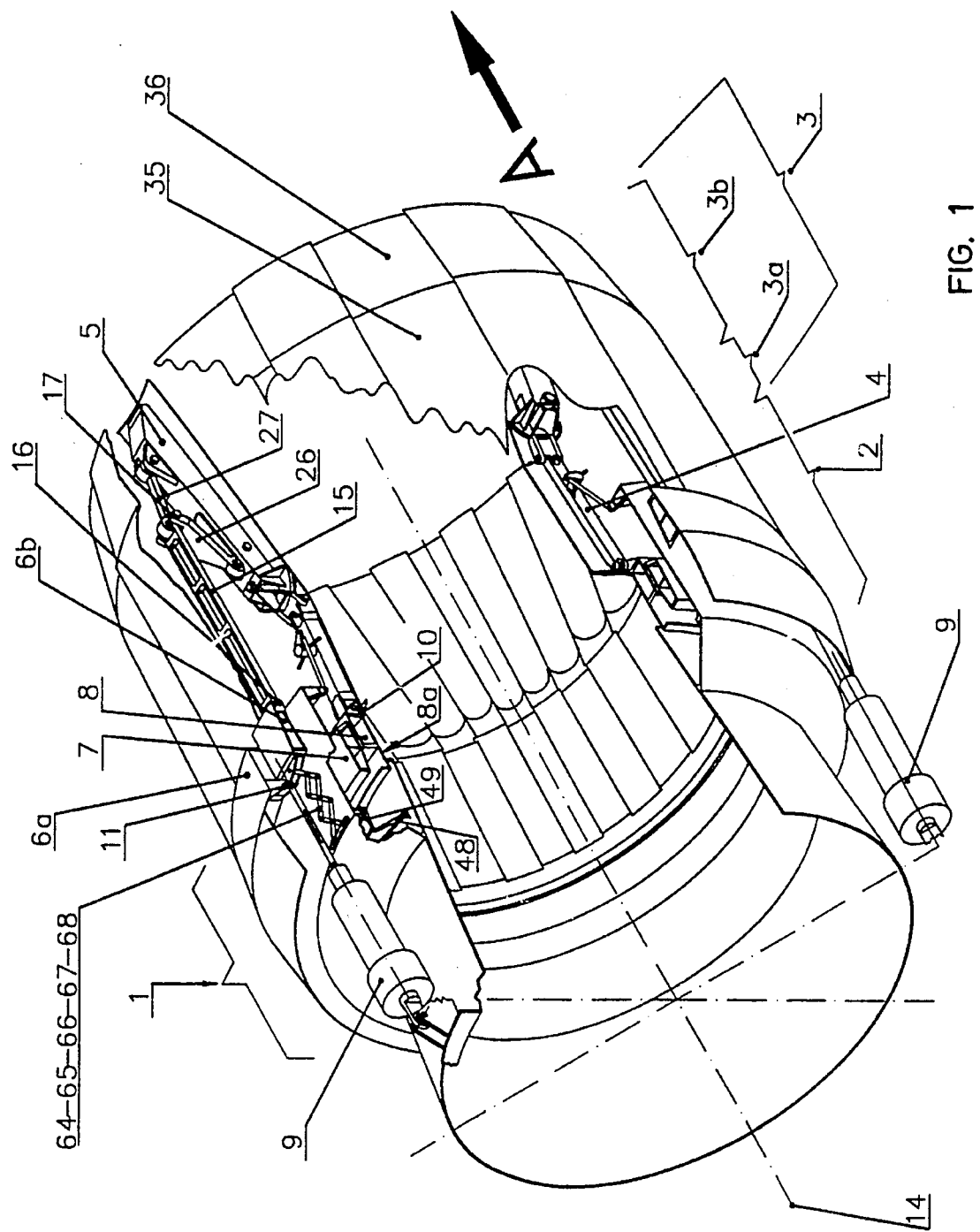
Figure 1A:
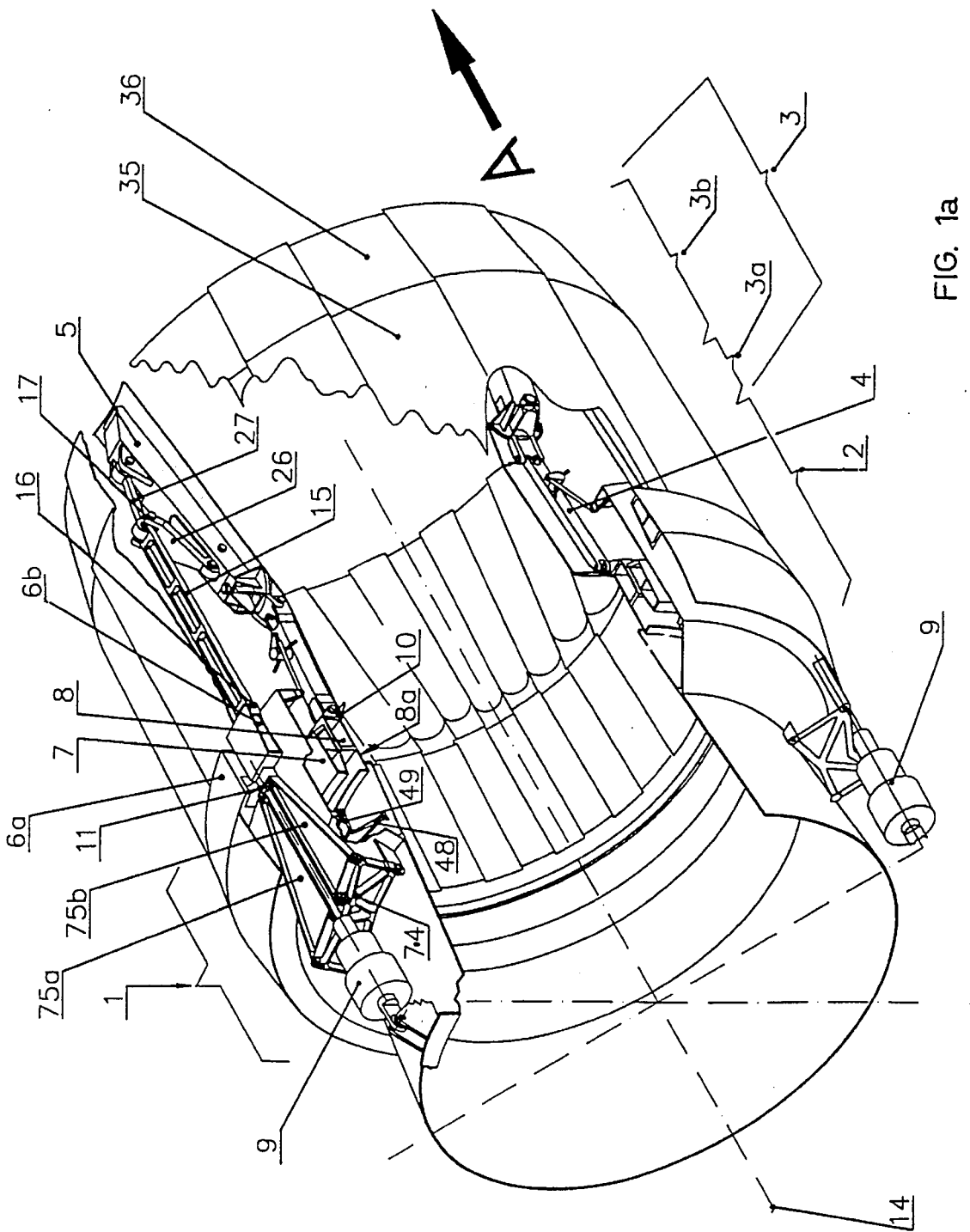
Figure 6:
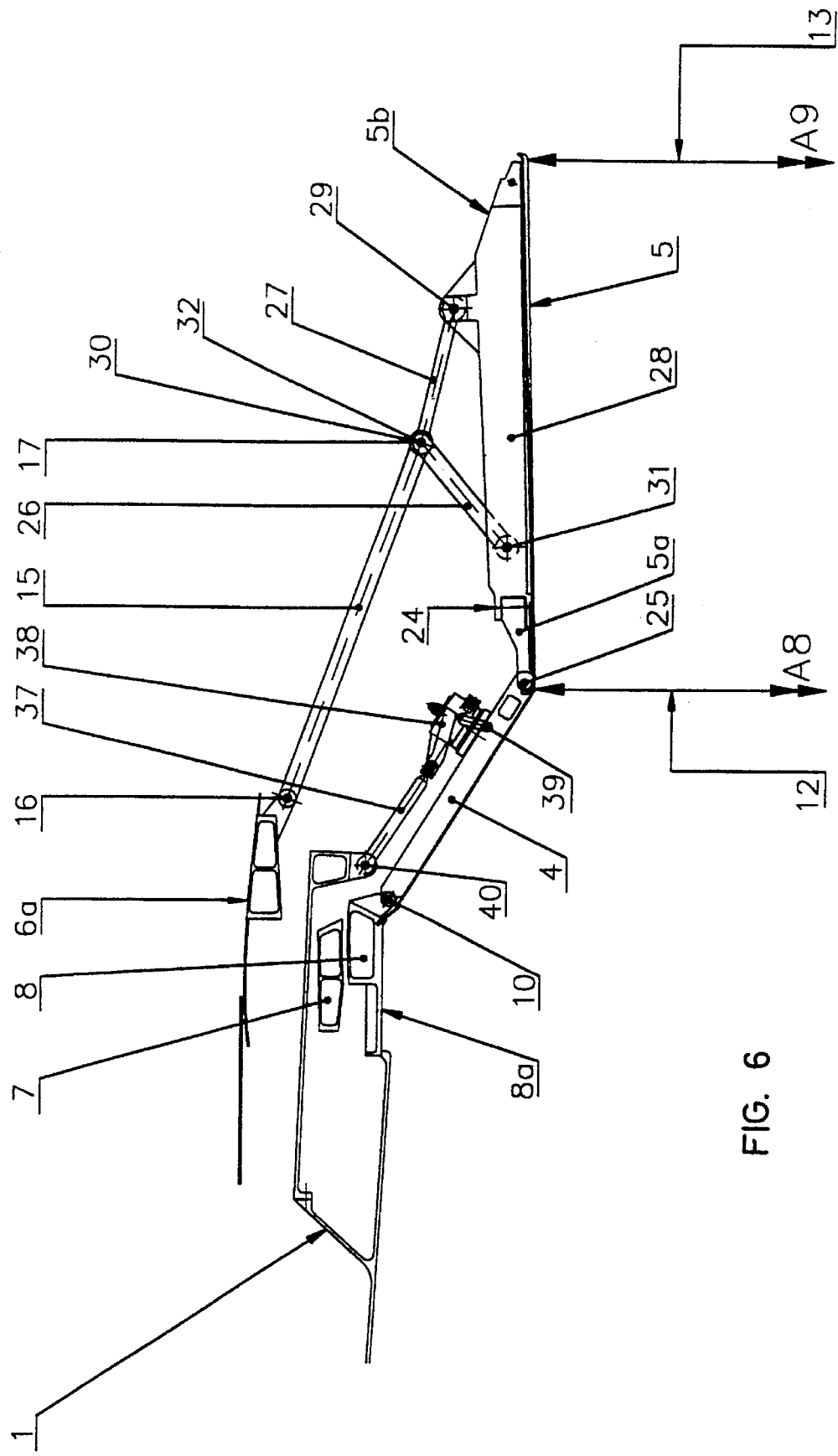
Figure 7:
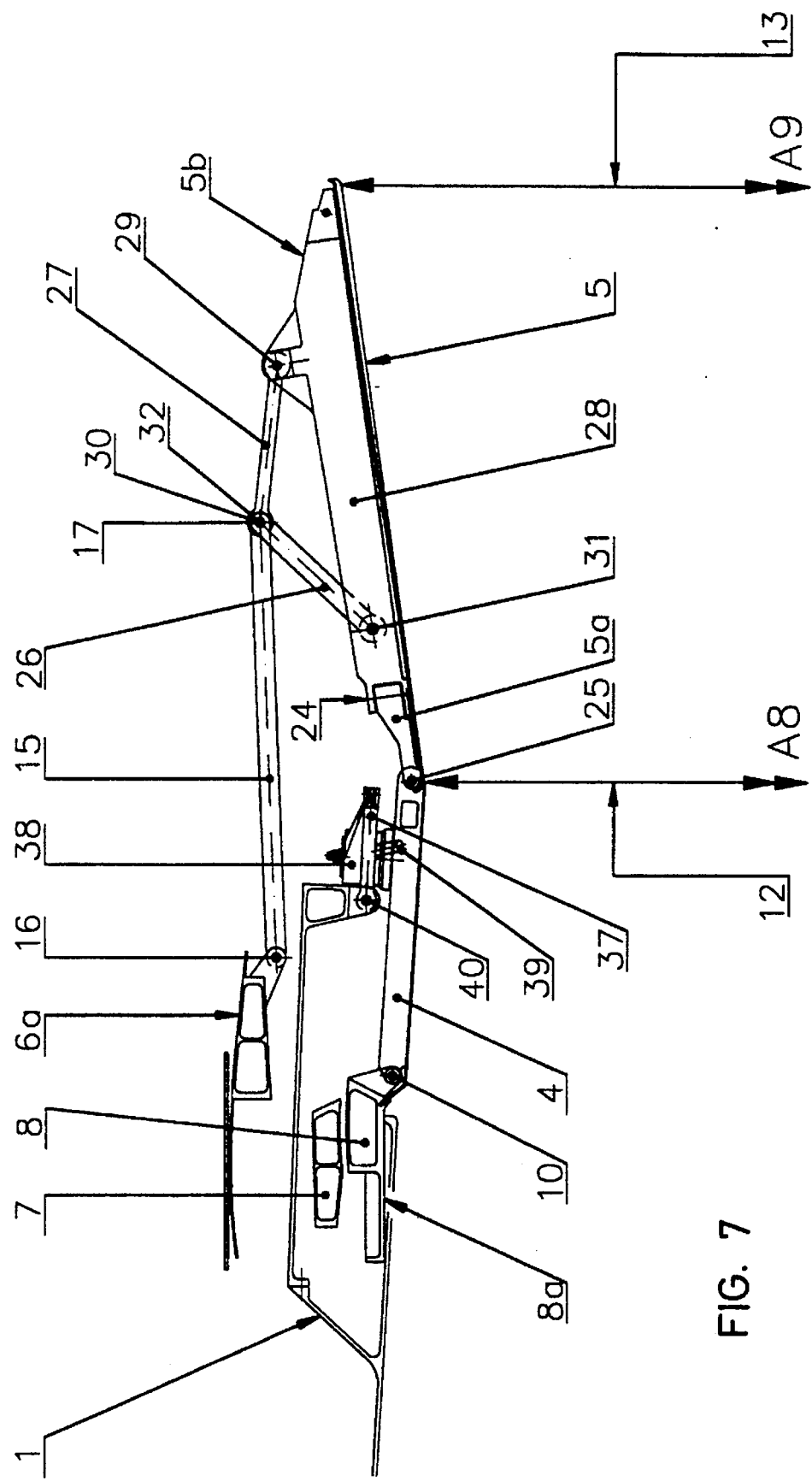
Figure 8:
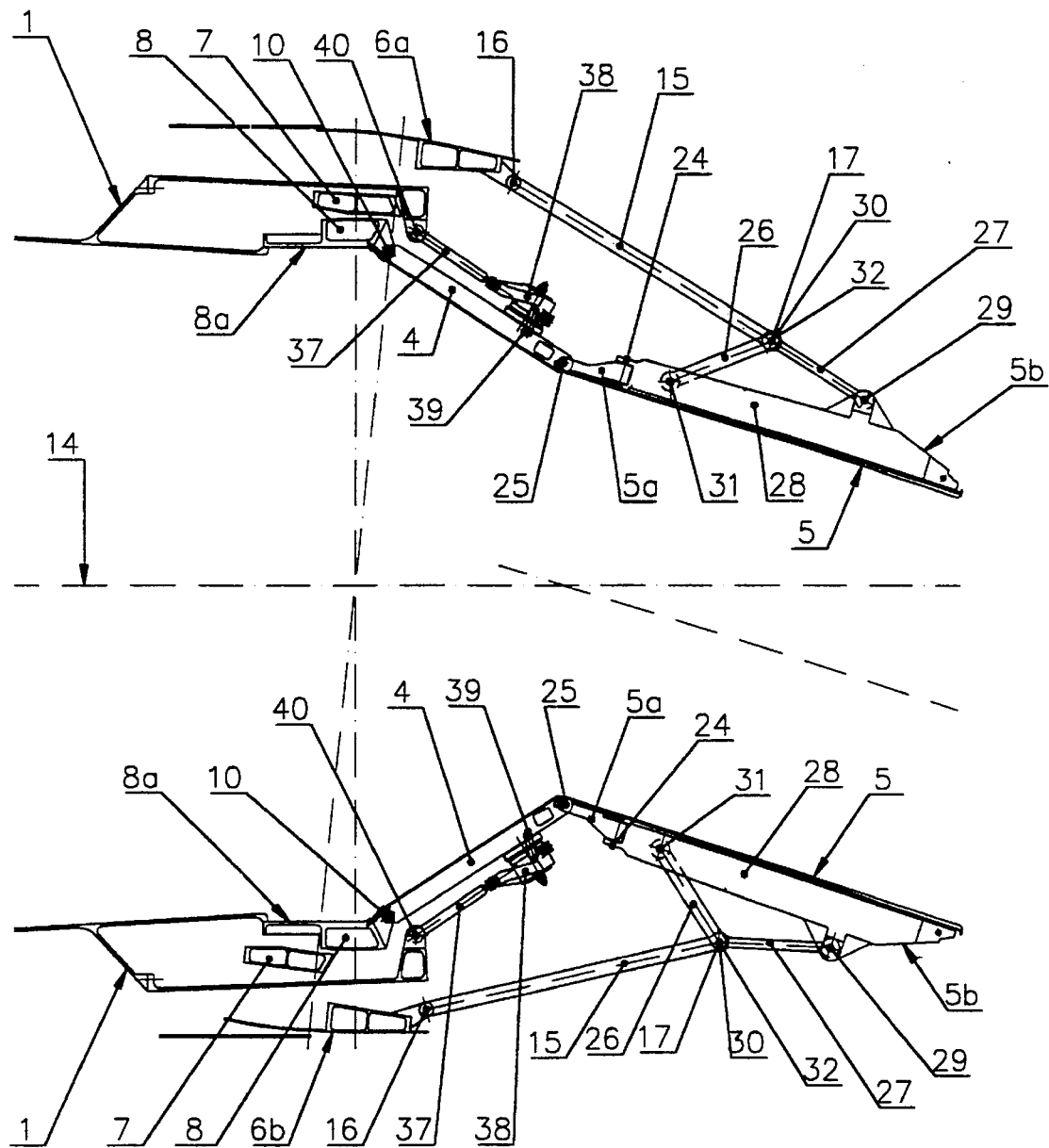
Figure 9:
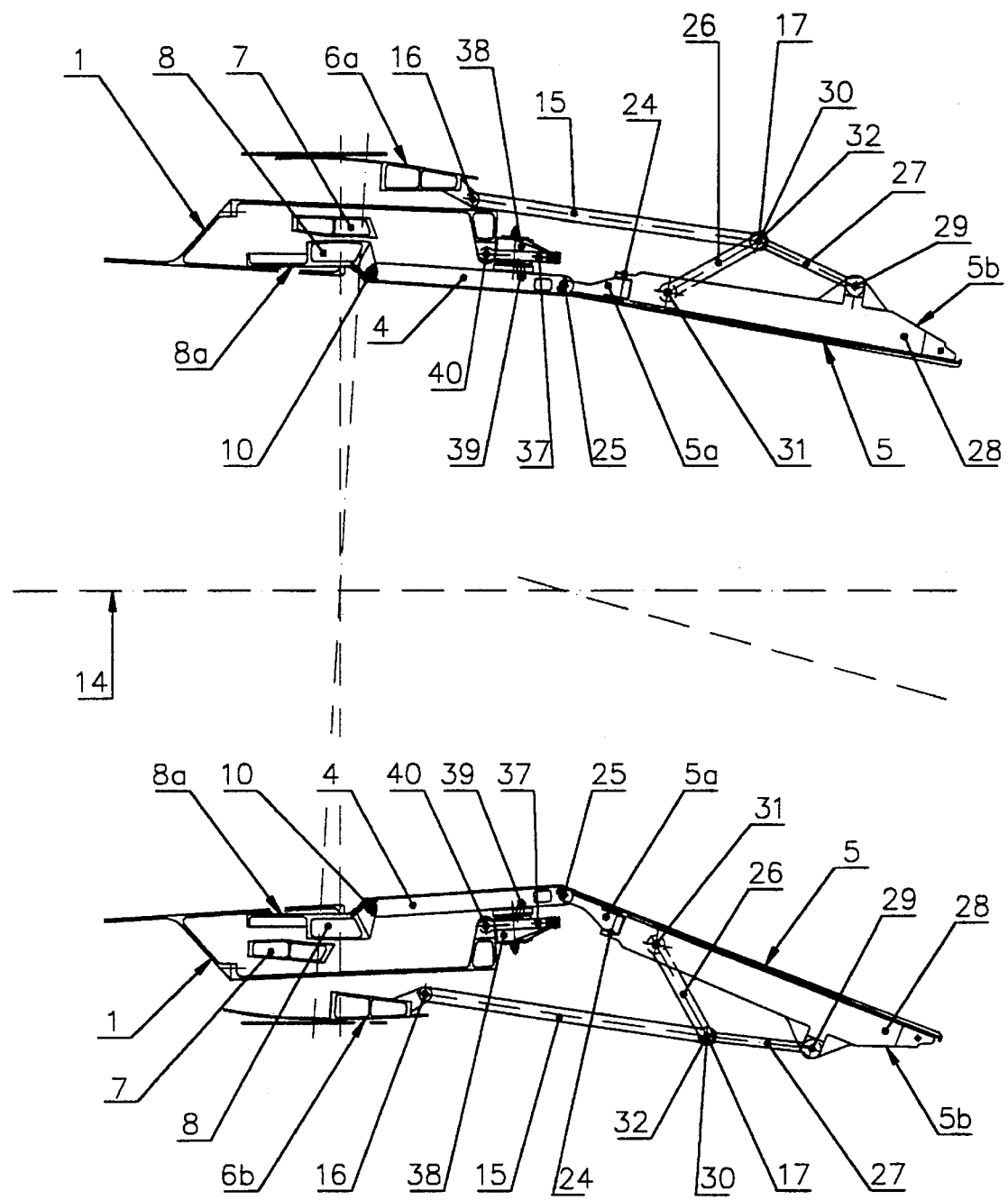
Figure 10:
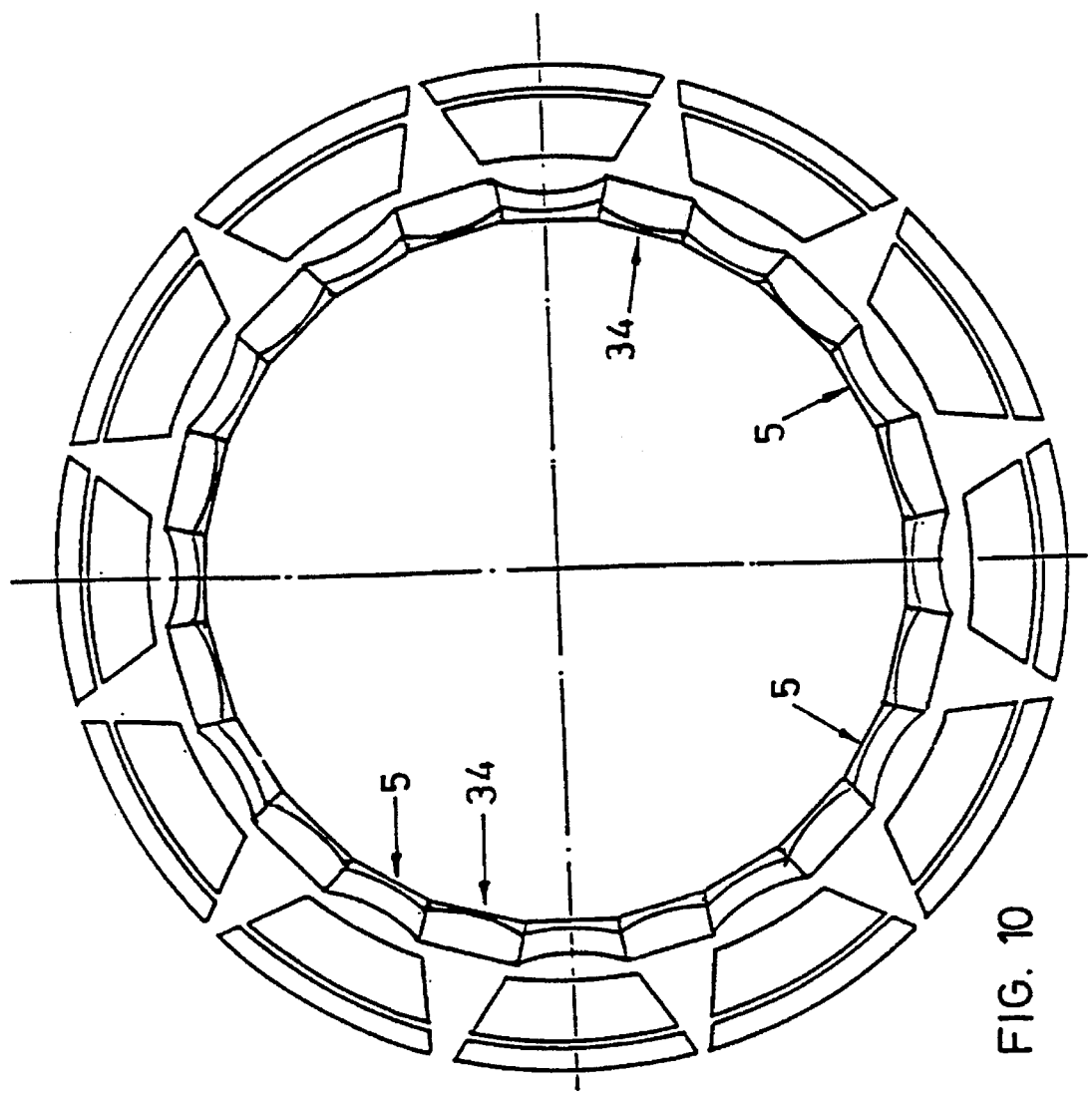

FIG. 1, like FIG. 1a, shows a diagrammatic and partially cutaway perspective view of the nozzle which is the subject of the description, the arrow A indicating the direction of the flow or circulation of the gases. Like traditional nozzles, that which is shown in FIGS. 1 and 1a includes a rear casing with the reference number 1 which constitutes the final end of the fixed structure of the engine, a convergent zone with the reference number 2 and a divergent zone with the reference number 3. The convergent zone 2 is composed of a plurality of main petals with the reference number 4 and secondary petals which are not shown. In the same manner, the divergent zone 3 consists of main petals 5 and secondary petals which are not shown and is subdivided into two parts: the part with the reference number 3a is called non-vectorizable and the part with the reference number 3b is called vectorizable. The nozzle also includes a single system for regulating the throat area A8, with the reference number 12 in FIG. 6 and defined by the intersection between the convergent main petals 4 and divergent main petals 5, and for vectorization of the thrust, and for symmetric variation of the outlet area A9 and for asymmetric correction of the outlet area A9.

The regulations of the throat area A8, and the correction of the outlet area A9, are achieved by a single control system which consists, in combination, of two movable rings having a single body each, called internal ring 8 and intermediate ring 7, and of two cylindrically interarticulated external ring segments called 6a and 6b which, in combination, form the external ring 6, the components of said combination of rings and ring segments being mutually concentric and concentric with the longitudinal axis 14 of the engine, and of a plurality of control actuators 9 which are articulated by their upstream end to the fixed structure of the engine 1.

The convergent main petals 4, FIGS. 4 to 9, are connected at their upstream end to the internal ring 8. This connection is achieved by cylindrical articulations 10 which are tangential to a theoretical circumference concentric with the longitudinal axis of the engine and located in a theoretical plane perpendicular to said longitudinal axis of the engine.

Figure 2:
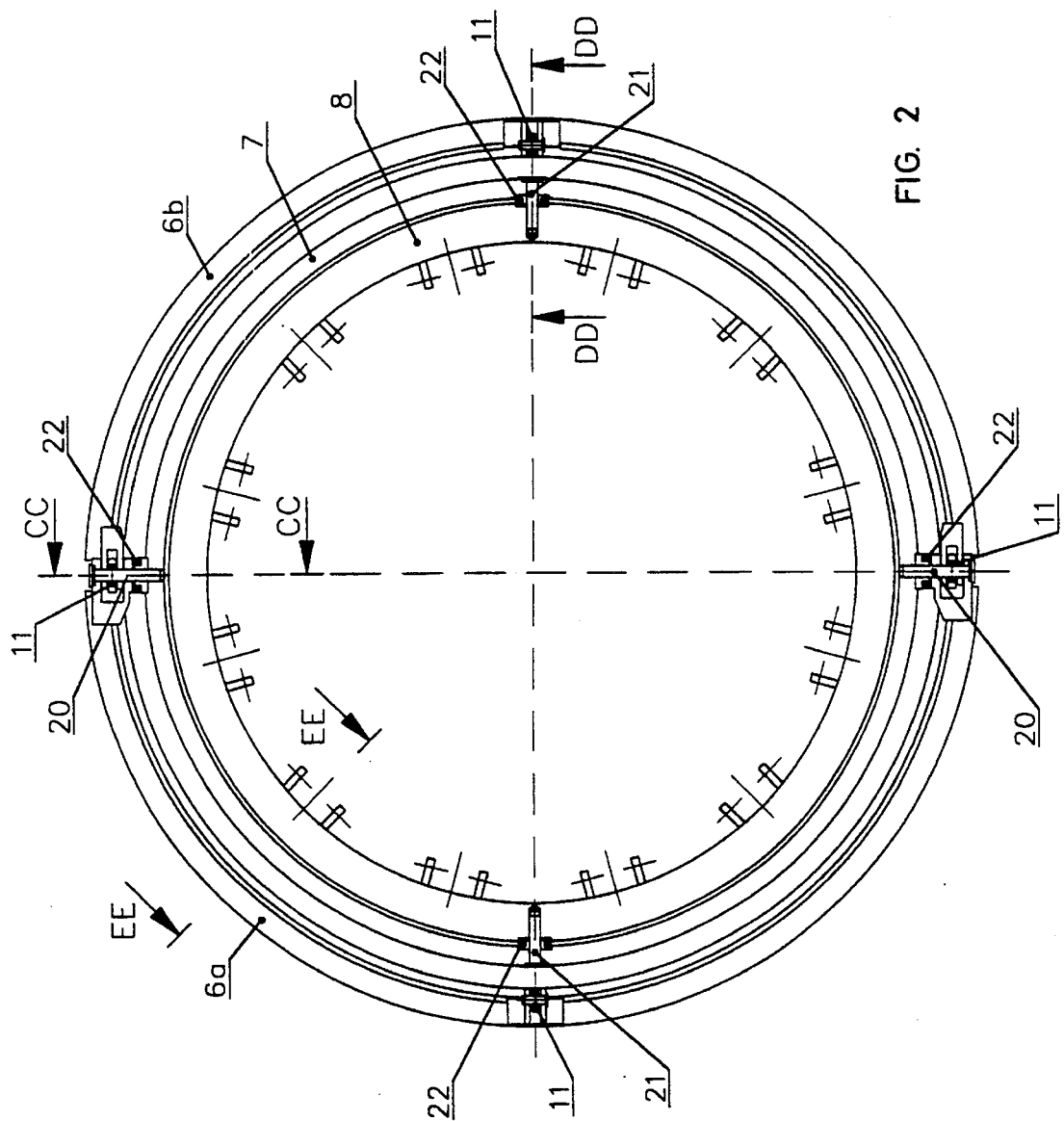
Figure 3:
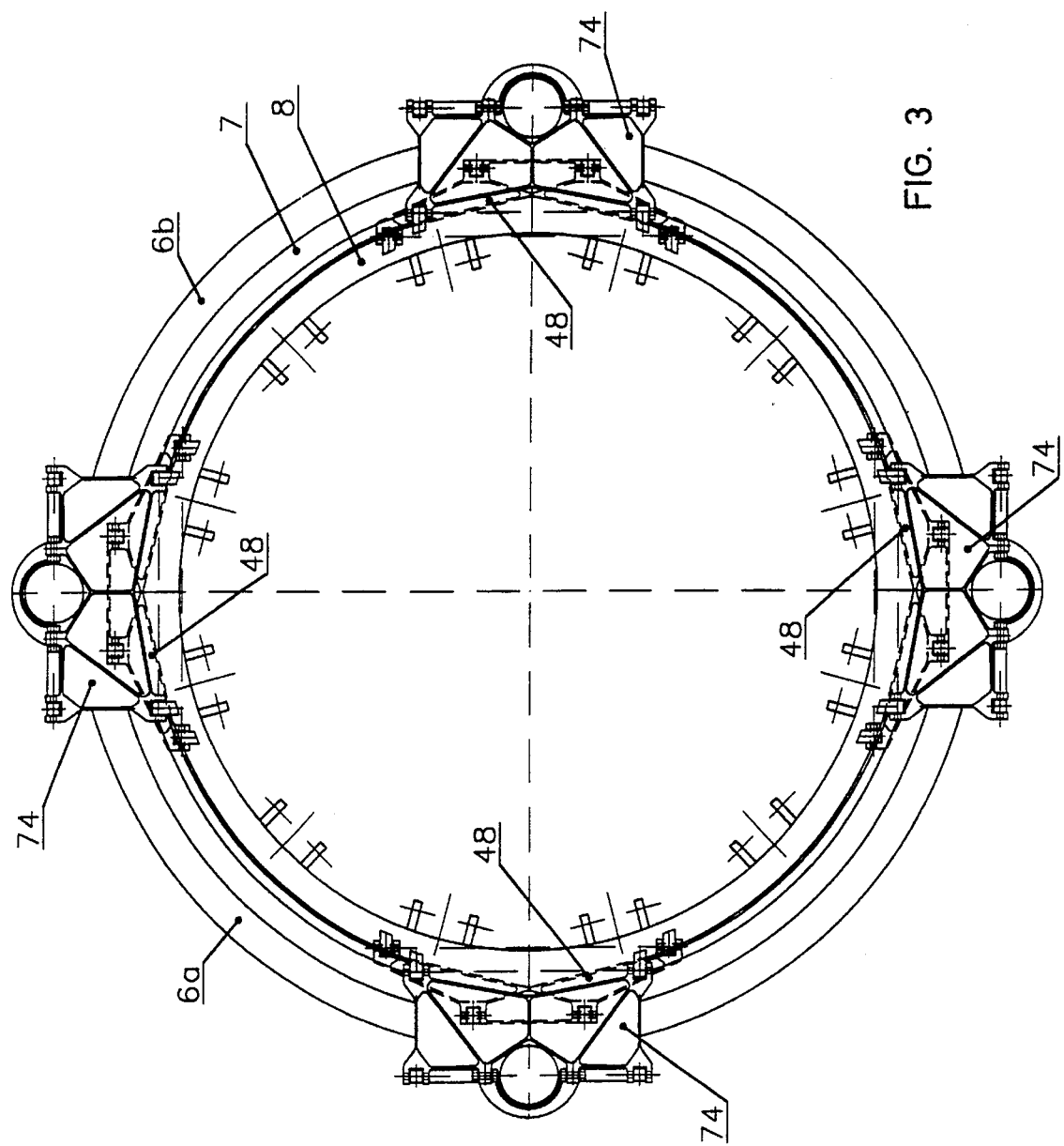
Figure 4:
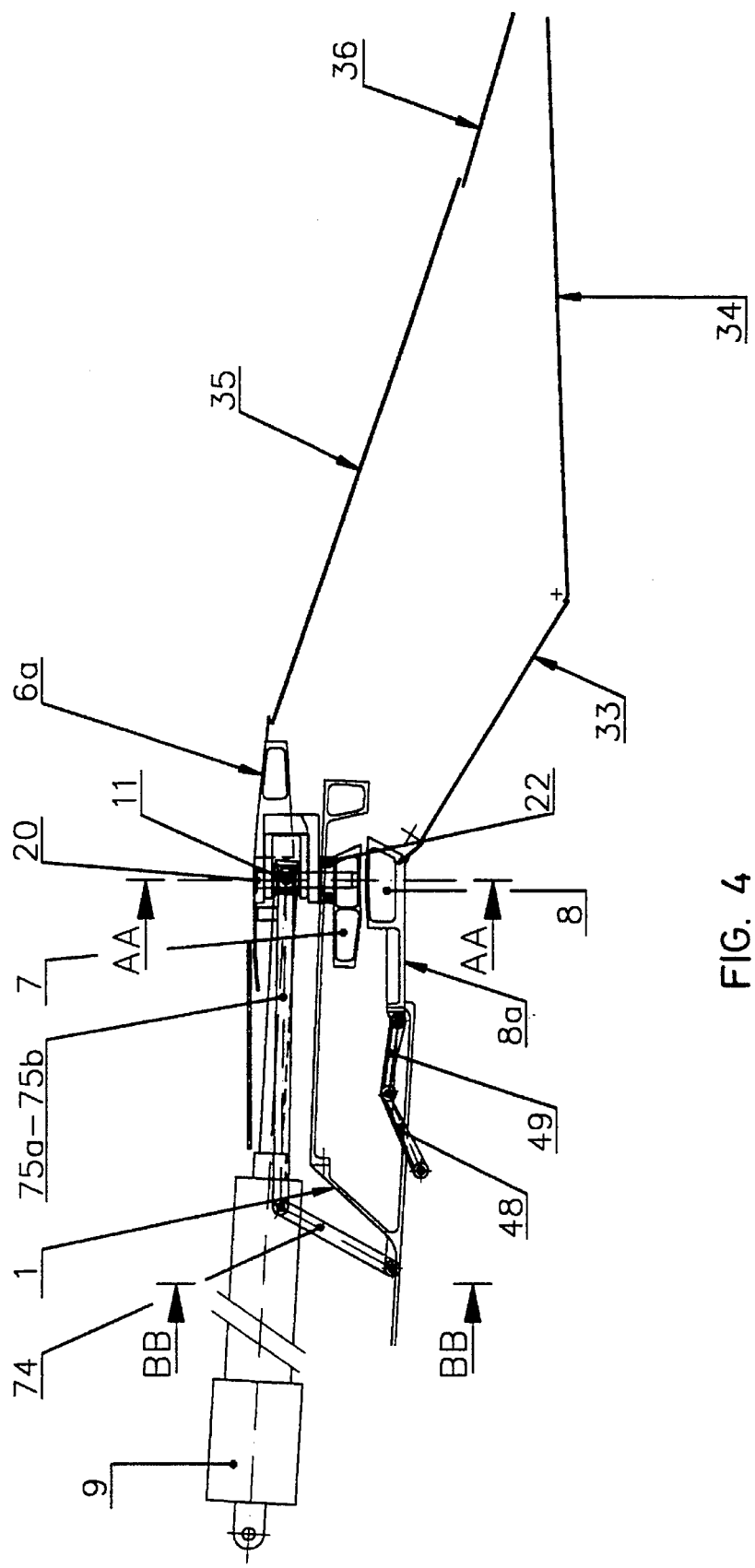
Figure 5:
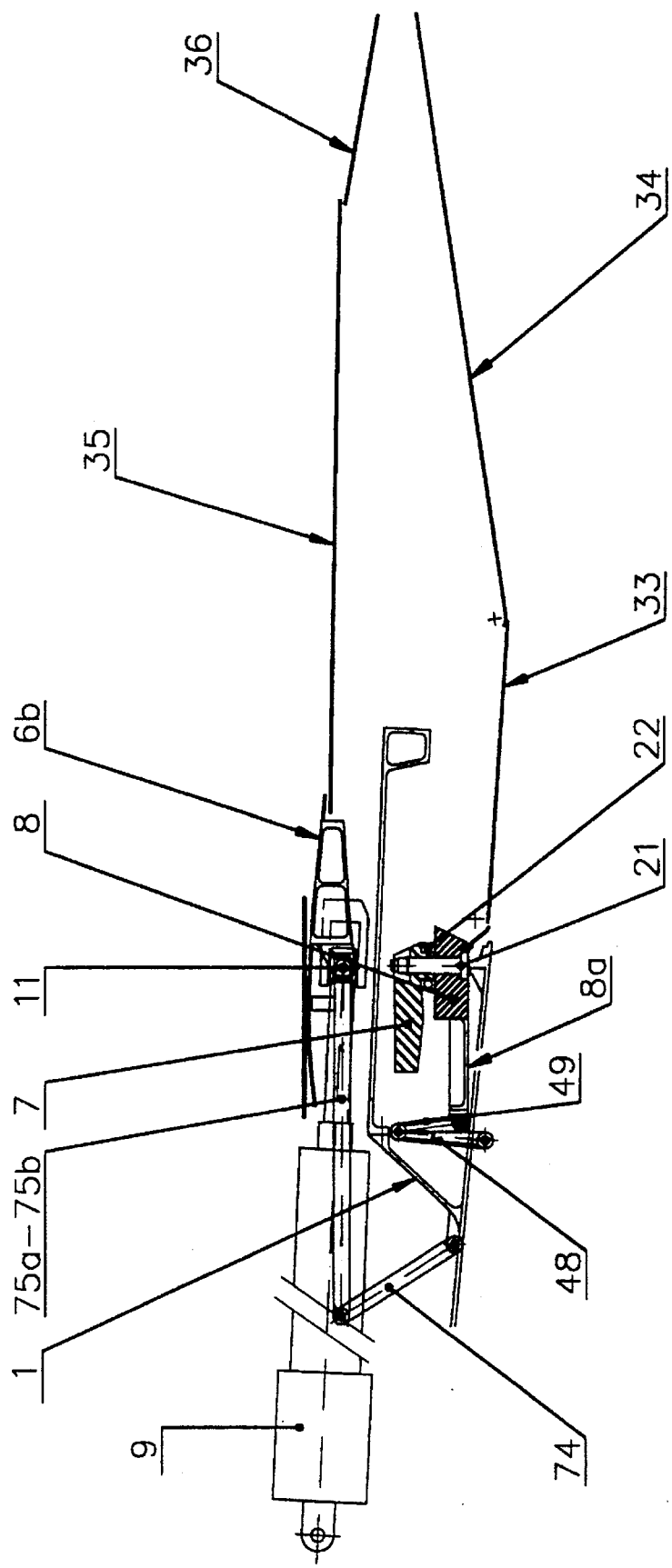

The downstream ends of the control actuators 9 are connected, by the ball-and-socket joints 11, FIGS. 2, 4 and 5, to the external ring segments 6a and 6b and to the cylindrical joining articulation between said external ring segments, defined by the spindles 20, FIGS. 2 and 4, which serves, in its turn, as the joint with the intermediate ring 7. In addition, the external ring segments 6a and 6b are connected to the divergent main petals 5 by the two-hinge bars 15 which are mounted concentrically about the longitudinal axis 14 of the engine. The connection of each double-jointed bar 15 to the external ring segments 6a and 6b is achieved by the cylindrical articulation 16 and its connection to the divergent main petal 5 is achieved by a cylindrical articulation 17 (FIG. 1a and 6 to 9). Both cylindrical articulations 16 and 17 are arranged so that, without orientation of the flow, they are tangent to a theoretical circumference concentric with the longitudinal axis of the engine and located in a theoretical plane perpendicular to said longitudinal axis of the engine.

The internal ring 8 and the intermediate ring 7 and the external ring segments, 6a and 6b, are mutually connected by two pairs of cylindrical articulations defined by the two pairs of spindles 20 and 21, with one pair being perpendicular to the other pair. One of the pair of spindles 21 connects the intermediate ring 7 to the internal ring 8, and the other pair of the spindles 20 connects the intermediate ring 7 to the articulated ends of the external ring segments 6a and 6b. This arrangement permits the axial displacement of the set of rings 7 and 8, and external ring segments 6a and 6b, in equal magnitude, with respect to the fixed structure of the engine 1; and it allows between the external ring segment 6a and 6b and the internal ring 8 and via the intermediate ring 7, a relative rotational movement in the space, defining a spherical joint, and permits, in addition, independent tilting between the external ring segments 6a and 6b.

In order to reduce the play between the external ring segments 6a and 6b and rings 7 and 8 and to minimize friction between them during their relative rotation, axial thrust bearings, with the reference number 22 in FIGS. 2, 4 and 5, are arranged concentrically with the spindles 20 and 21.

The control system of the nozzle includes, in addition, a mechanism for regulating the throat area A8, which, as shown in FIGS. 6 to 9, 12 and 13, is composed, for each convergent main petal, of a single link rod 37, a crank having two arms 38 and a peripheral bar 39, said link rod 37 being joined at its upstream end by a ball-and-socket joint 40 to the downstream end of the fixed structure 1 of the engine, and, by its downstream end to one of the arms 41 of said crank 38 which is mounted in an articulated manner on a pivot 42 which, forming an integral part of said convergent main petal 4, has its axis perpendicular to the base of said convergent main petal, while the other arm 43 of said crank 38 is connected, by the ball-and-socket joint 44, to one of the ends of the peripheral bar 39 and the other end of said peripheral bar is joined by ball-and-socket joint 45 to the pivot 42 of the adjacent convergent main petal, so that the assembly of cranks 38 and peripheral bars 39 of all the convergent main petals 4 form a peripheral system which is closed on itself.

Figure 12:
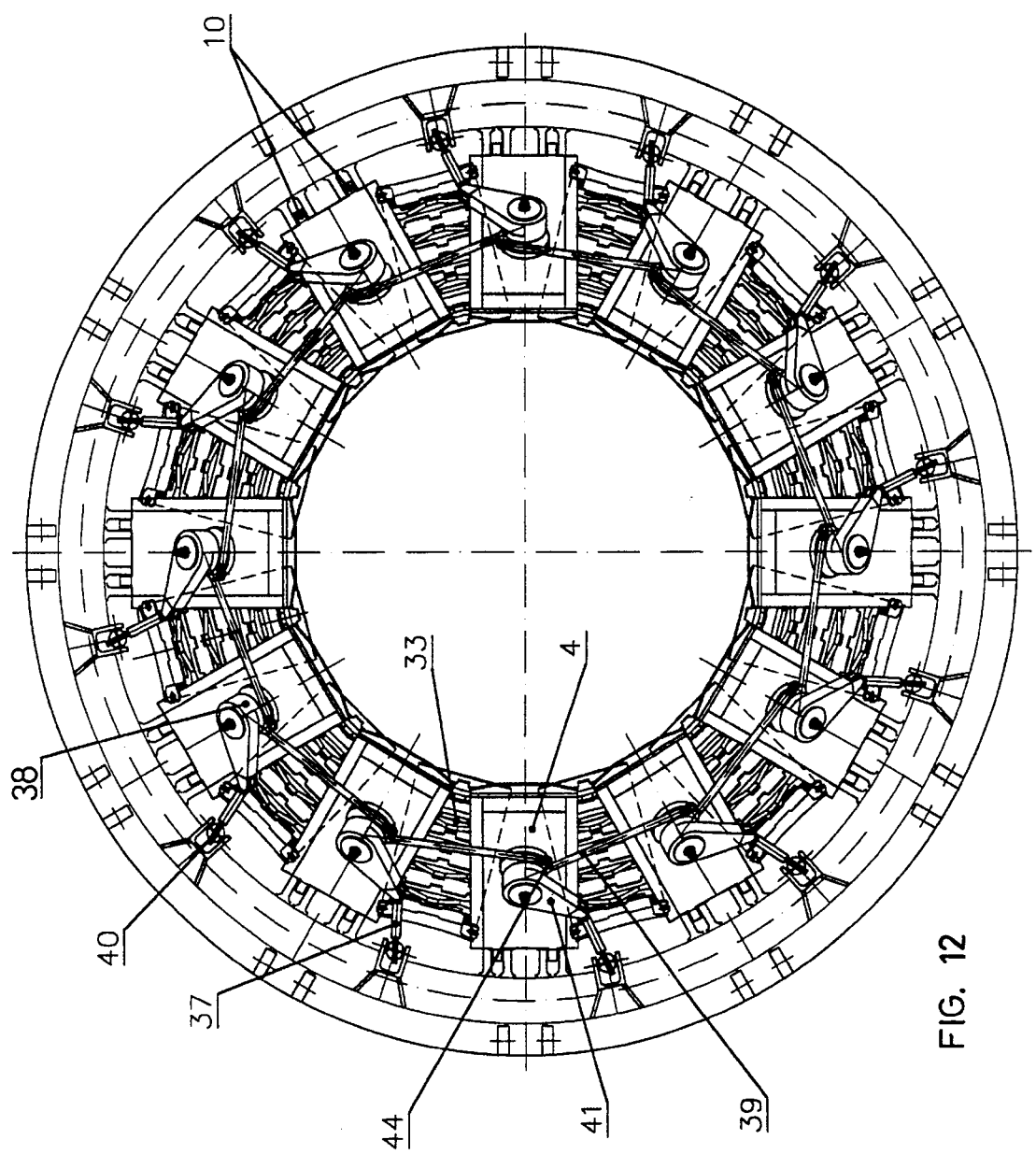

In addition, FIG. 12 shows a perspective view of the mechanism regulating for varying the throat area A8 which is the subject of Spanish Patent Application No. 9301515 which mentions the embodiment of a peripheral mechanism for regulating the throat area A8 consisting of an assembly of a single link rod 37, a crank having only two arms 38 and a peripheral bar 39 for each convergent main petal. The physical configuration of this mechanism is that belonging to a convergent axisymmetric nozzle.

FIGS. 13a to 13d show a detail of the crank having two arms 38 and the pivot 42, on which said crank having two arms 38 is articulated, which, forming an integral part of the convergent main petal 4, has its axis perpendicular to the base of said convergent main petal. The crank having two arms 38 has a lateral groove 46 to permit mounting of the articulated end of the peripheral bar 39 on the pivot 42 of the convergent main petal 4, which groove 46, as an improvement with respect to Spanish Patent Application No. 9301515, is closed with a bolt 47 once said mounting operation is complete.

As may be seen FIGS. 1, 1a and 3 to 9, the internal ring 8 has a cylindrical extension 8a by which it is possible to seal the afterburner during regulation of the throat area A8 12 of the nozzle. The axis of this cylindrical extension 8a must always be located in the longitudinal axis 14 of the engine, for which purpose there will be available, at the upstream end of said cylindrical extension 8a, at least three hinges for joining to the fixed structure 1 of the engine which will make it possible to move the internal ring 8 solely in the axial direction, the hinges being composed of two leaves 48 and 49 articulated cylindrically together, between the upstream leaf 48 and the fixed structure 1 of the engine and between the downstream leaf 49 and the cylindrical extension 8a.

For their part, the external ring segments 6a and 6b are guided and supported laterally by support means of the tangential type, which are planar systems of articulated bars or hinges: The upstream end of each support means is joined, in an articulated manner, to the fixed structure 1 of the engine, FIGS. 1, 1a and 3 to 5, and the downstream end of the each support means in joined, in an articulated manner, to the external ring segments, permitting the downstream end of the support means to move in the axial direction, and allowing the tilting of the external ring segments 6a and 6b, with a center of tilting in the longitudinal of the engine. The systems described for guiding the external ring segments 6a and 6b and internal ring 8 will have to absorb the shear forces which arise during the orientation of the flow and those caused by asymmetry of the loads.

The arrangement described, shown in the Figures, permits, by the activation in one or other direction of the control actuators 9, the following functions which have already been mentioned:

1. Axial movement, in one and the same direction, of the assembly of the external ring segments 6a and 6b and intermediate ring 7 and internal ring 8, together with the two-jointed bars 15, and the convergent and divergent petals, in order to regulate the throat area A8, given reference number 12 in FIGS. 6 and 7. Said axial movement of the external ring segments 6a and 6b and rings 7 and 8 gives rise to an angular displacement of the convergent main petals 4 through the peripheral mechanism for regulating the area of the throat A8 about the articulation 10. Said convergent main petals 4, owing to the link rod 37, the crank having two arms 38 and the peripheral bar 39, open or close in the radial direction, defining, together with the two-jointed bars 15, the position of the divergent main petals 5. In this function, the control actuators 9 always have the same length.

2. Simultaneous and opposite direction tilting of the two external ring segments 6a and 6b, in order to achieve through the tow-hinged bars 15, a symmetrical variation of the outlet area A9 13 with respect to an immobilized area A8, with or without orientation of the flow. In this second function, the actuators of the control system which move the external ring segments have equal increases in travel.

3. The external ring segments 6a and 6b tilt, as a single body, over a theoretical spherical surface, centered of the longitudinal axis 14 of the engine, and the internal ring 8 remains immobilized in any axial position in order to achieve, through the two-hinged bars 15, vectorization of the thrust about the longitudinal axis 14 of the engine. In this third function, the control actuators 9 have different lengths.

4. In an orientated flow geometry, with an independent tilting of only one of the external ring segments 6a or 6b, the outlet area A9, is corrected asymmetrically through the two-hinged bars 15. In this fourth function, only those actuators of the control system which move the tilted external ring segment have a negative increment. The four functions may be achieved simultaneously.

Figure 11:
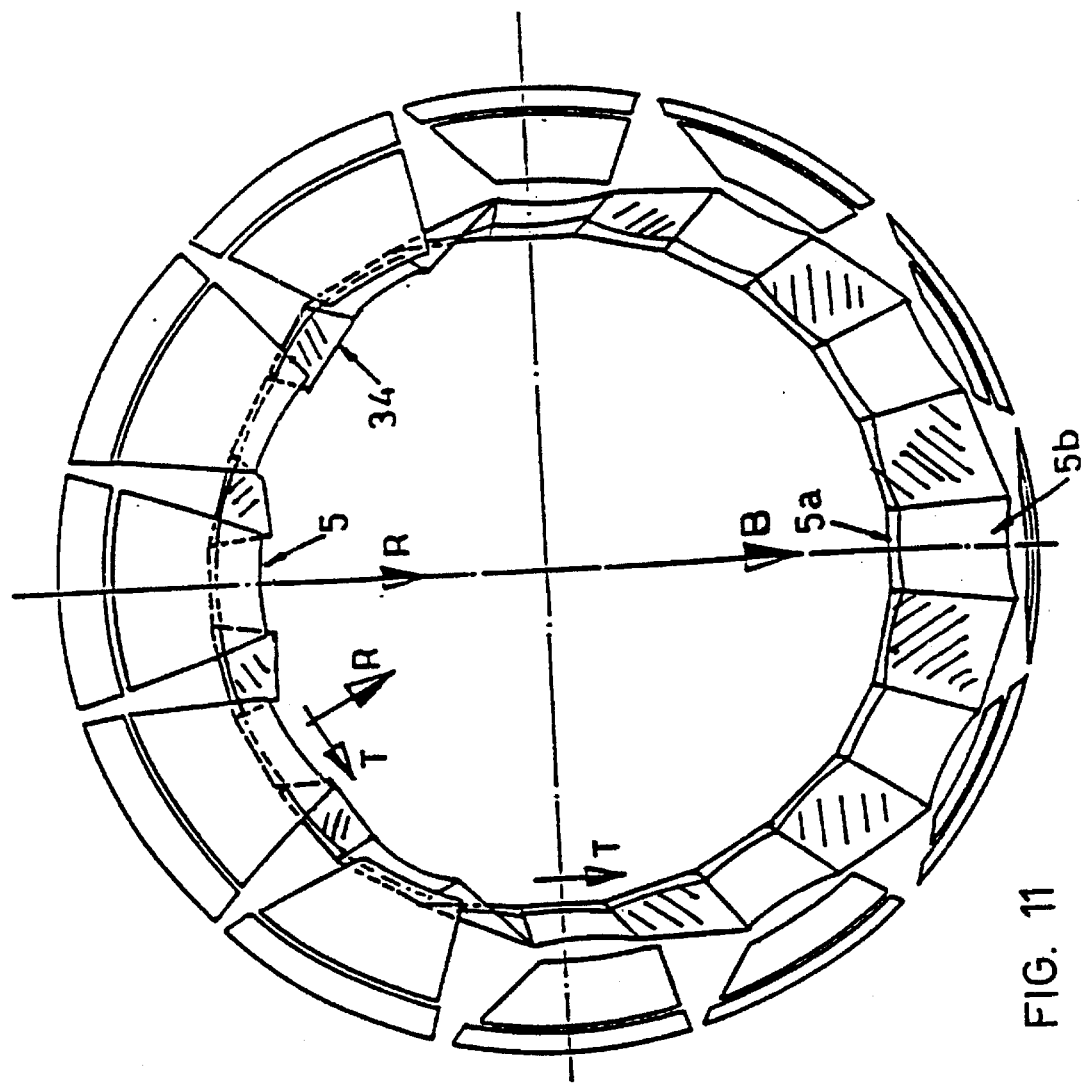

In the vectorization function, the two-hinged bars 15 which are joined by a cylindrical articulation 16 to the external ring segments 6a or 6b turn with said external ring segments and force the divergent main petals 5 to move in the radial direction, as has been indicated with the arrow R in FIG. 11, and also in the tangential direction, referenced with the arrow T in the same FIG. 11, thus making it possible to achieve the orientation of the flow in the direction indicated by the arrow B. To this end, the divergent main petal is subdivided into two segments, given reference numbers 5a and 5b, joined mutually by a cylindrical articulation 24 arranged in a direction perpendicular to the mid line of the base of the petal 5, as may be seen better in FIGS. 6 to 9. The segment portion 5a is joined by a cylindrical articulation 25 to the convergent main petal 4, FIGS. 6 to 9. The downstream segment 5b of each divergent main petal consists of: an upstream intermediate bar 26 and a downstream intermediate bar 27 plus a stiffened plate 28 whose inner surface is seen by the flow of gases as described in Spanish Patent Application referenced No. 9302455, of 1993. The upstream intermediate bar 26 is interlinked to the two-hinged bar 15 by a cylindrical articulation 30 and to the vectorizable segment 5b of the divergent main petal by means of a spherical knuckle 31, at the same time as said cylindrical articulation 30 is joined to the downstream end of said vectorizable segment 5b of the divergent main petal by the downstream intermediate bar 27, each having spherical knuckles 32 and 29.

Movements similar to those referenced with the letters R and T with symmetry with respect to the articulation spindle 20 are embodied in the second function, and only over a half circumference in the case of the fourth function.

FIGS. 4 and 5 both show, diagrammatically, the convergent secondary petals 33 and divergent secondary petals 34 for sealing the gaps between main petals 4 and 5. As has been explained above, in Spanish Patent Application No. 9202157, of 1992, a solution is proposed for the divergent secondary petal 34 which makes it possible to solve the problem of the gap between divergent main petals during the orientation of the flow. FIG. 28 shows an embodiment of said divergent secondary petal.

The inner surface of the divergent main petal has been shown in FIGS. 1, 1a and 6 to 11 and 27 as proposed in Spanish Patent Application No. 9301991, of 1993, that is to say with variable form between two cross sections, one of them with a straight base located close to the upstream transverse edge of the divergent main petal 5 and the other with a curved base close to the far downstream transverse edge of the petal 5 and with its convexity facing the longitudinal axis 14 of the engine.

For reasons of clarity, FIGS. 6 to 11 do not show the movable elements 35 and 36 which constitute the movable cover of the nozzle, these being similar to those described in Spanish Patent No. 9200369, of 1992. Said movable elements 35 and 36 are shown in FIGS. 1, 1a, 4 and 5 only.

FIGS. 14 to 24 show the various support means of the tangential type for support of the external ring segments which are the subject of this patent.

FIG. 14 shows a Desjonges mechanism which consists of two bars 50 and 51 interlinked by cylindrical articulation 52, with a track 53 in the direction normal to the longitudinal axis of the engine and aligned with the fixed articulated support member 54 of the second bar 51 on the upstream end of said mechanism and with a spherical knuckle on the track 53 and on the fixed support member 54 of the second bar and on the articulation 55 with the external ring segment 6a or 6b or with the join of both of them, and the path of said articulation 55 passing via said fixed articulation 54 of the second bar 51 and included within a plane which contains the longitudinal axis 14 of the engine.

Figure 15:
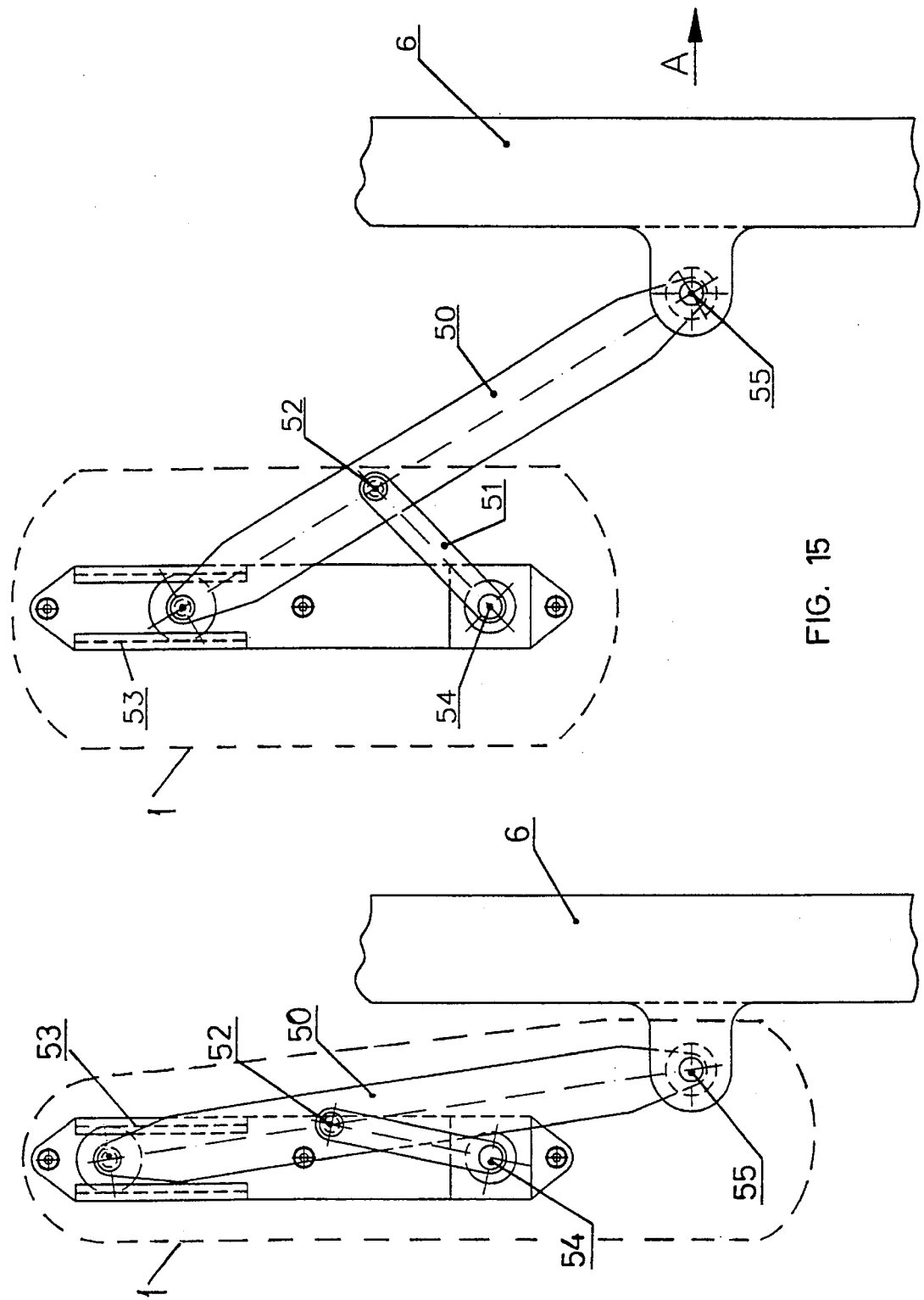

FIG. 15 shows a Desjonges mechanism similar to the above but with the path of the articulation 55 passing outside said fixed articulation 54 of the second bar 51 and included within a plane which contains the longitudinal axis 14 of the engine. This mechanism makes it possible to join the downstream end of an actuator to the same articulation 55.

Figure 16:
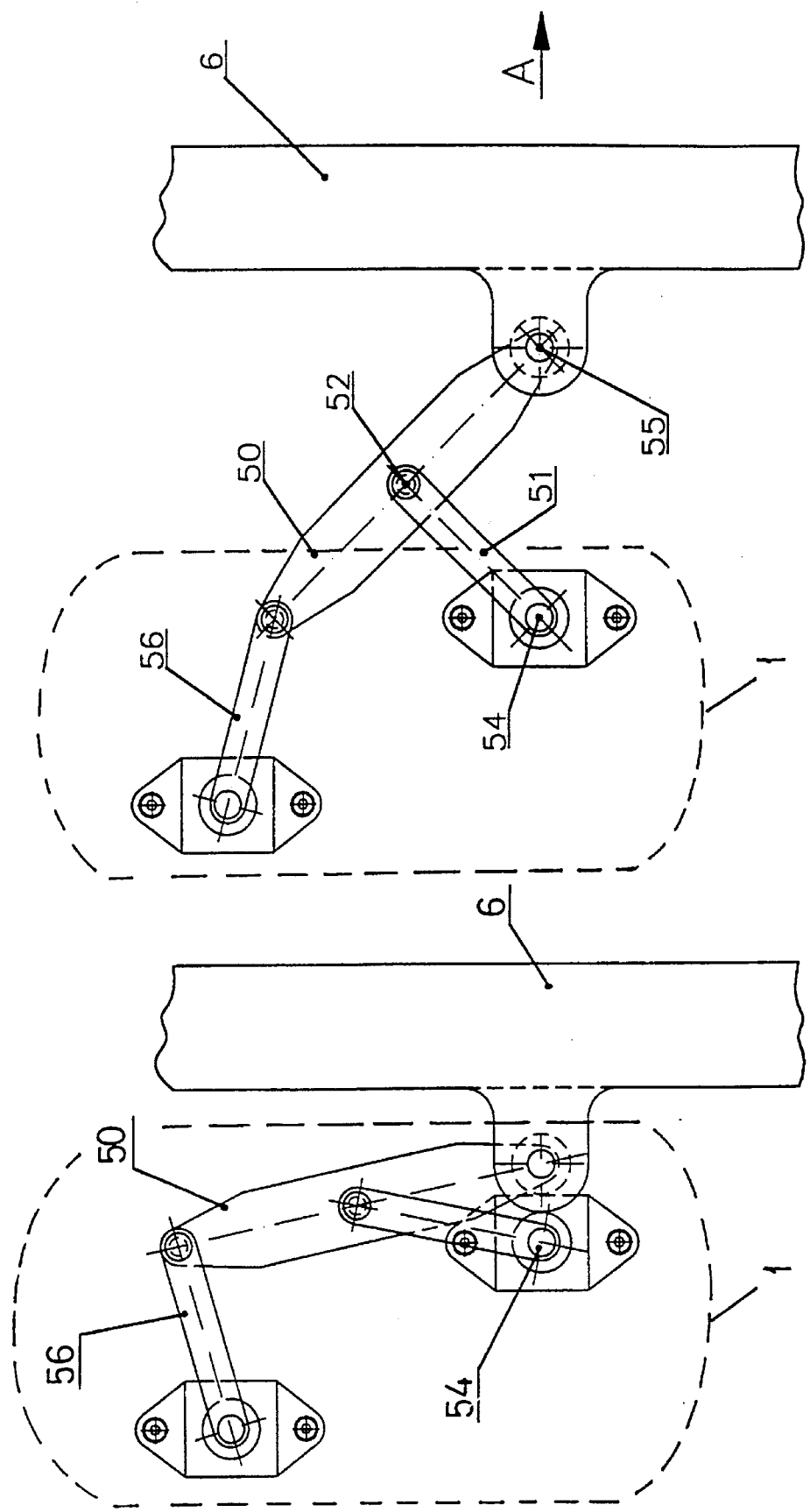

FIG. 16 shows an articulated Evans-Desjonges quadrilateral mechanism with a crank 56 which replaces the track 53 in a Desjonges mechanism.

FIG. 17 shows a conchoidal mechanism which consists of two bars 57 and 58 which are interlinked by a cylindrical articulation 59, with a tilting track 60 along one of the bars and articulated at a fixed point 61 aligned with the fixed articulated support member 62 of the second bar perpendicularly to the longitudinal axis of the engine on the upstream end of said mechanism and with a spherical knuckle on the fixed point of the track 61 and on the fixed support member 62 of the second bar at the articulation 63 with the external ring segment 6a or 6b or together with the join of both of them, and the path of said articulation 63 passing via an intermediate point on the base of said conchoidal mechanism and included within a plane which contains the longitudinal axis 14 of the engine.

Figure 18:
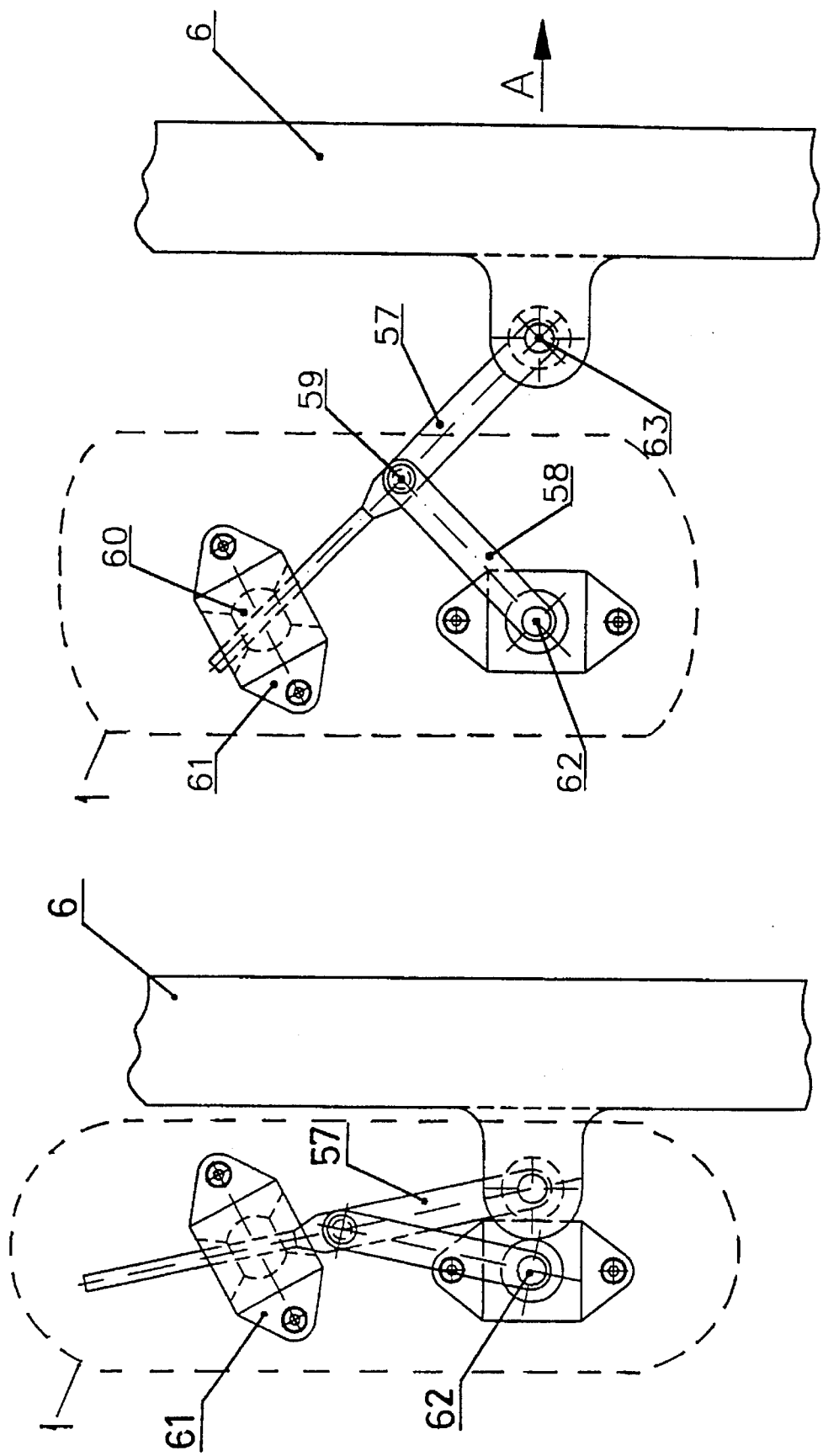

FIG. 18 shows a conchoidal mechanism similar to the above, but with the path of said articulation 63 passing via the fixed articulated support member of the second bar and included within a plane which contains the longitudinal axis 14 of the engine.

Figure 19:
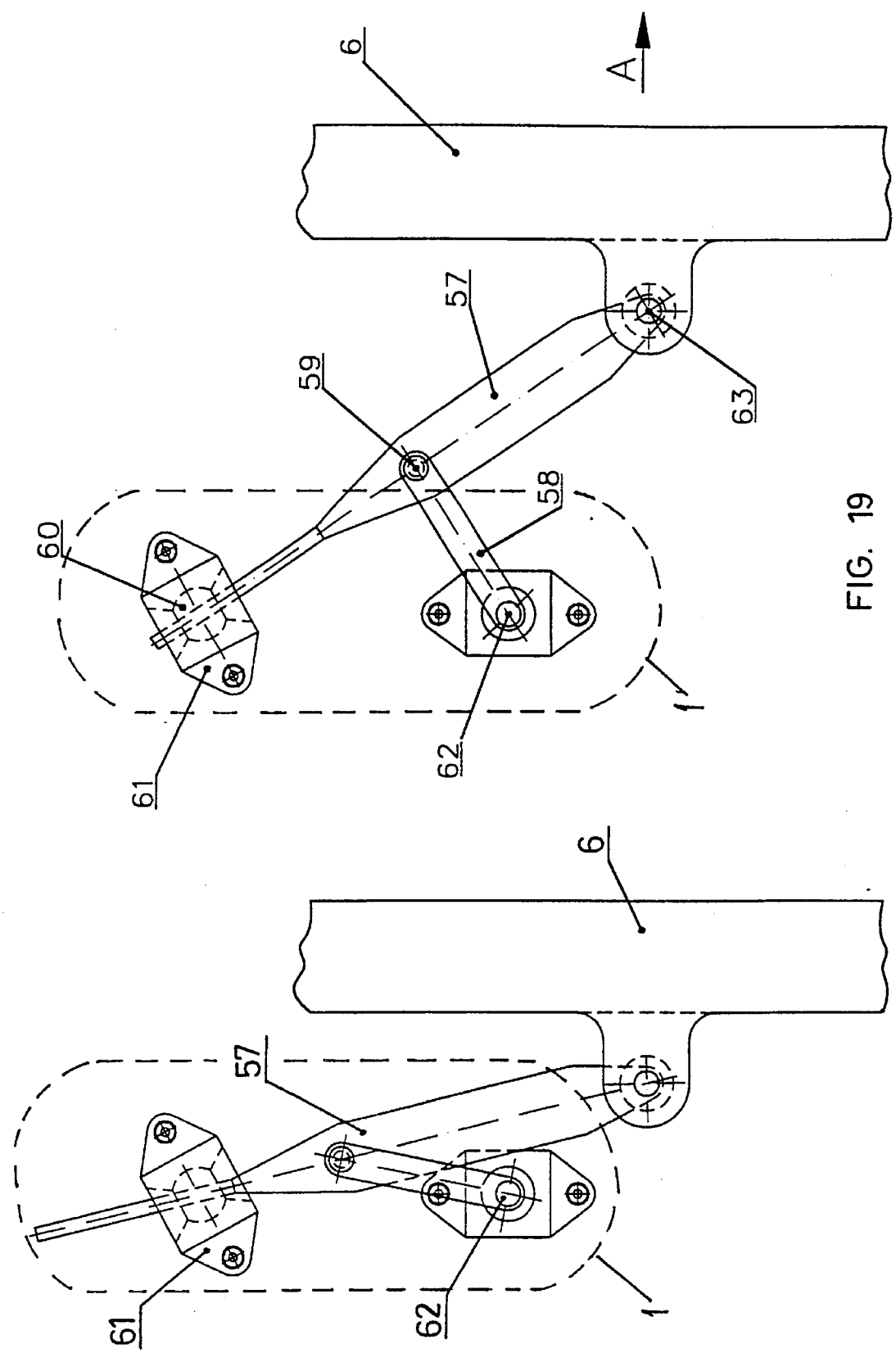

FIG. 19 shows a conchoidal mechanism similar to the above, but with the path of said articulation 63 passing outside the base of said conchoidal mechanism and included within a plane which contains the longitudinal axis 14 of the engine.

FIG. 20 shows a single scissors mechanism with a track 64 in the direction normal to the longitudinal axis of the engine and aligned with the fixed articulated support member 65 at the upstream end of said single scissors mechanism, having four bars 66 with cylindrical articulations 67 which interlink said bars and spherical knuckle both at the track 64 and on the fixed support member 65 and on the articulation 68 with the external ring segments 6a or 6b or with the join of both of them, and the path of said articulation 68 passing via the fixed support member 65 of said mechanism and included in a plane which contains the longitudinal axis 14 of the engine.

Figure 21:
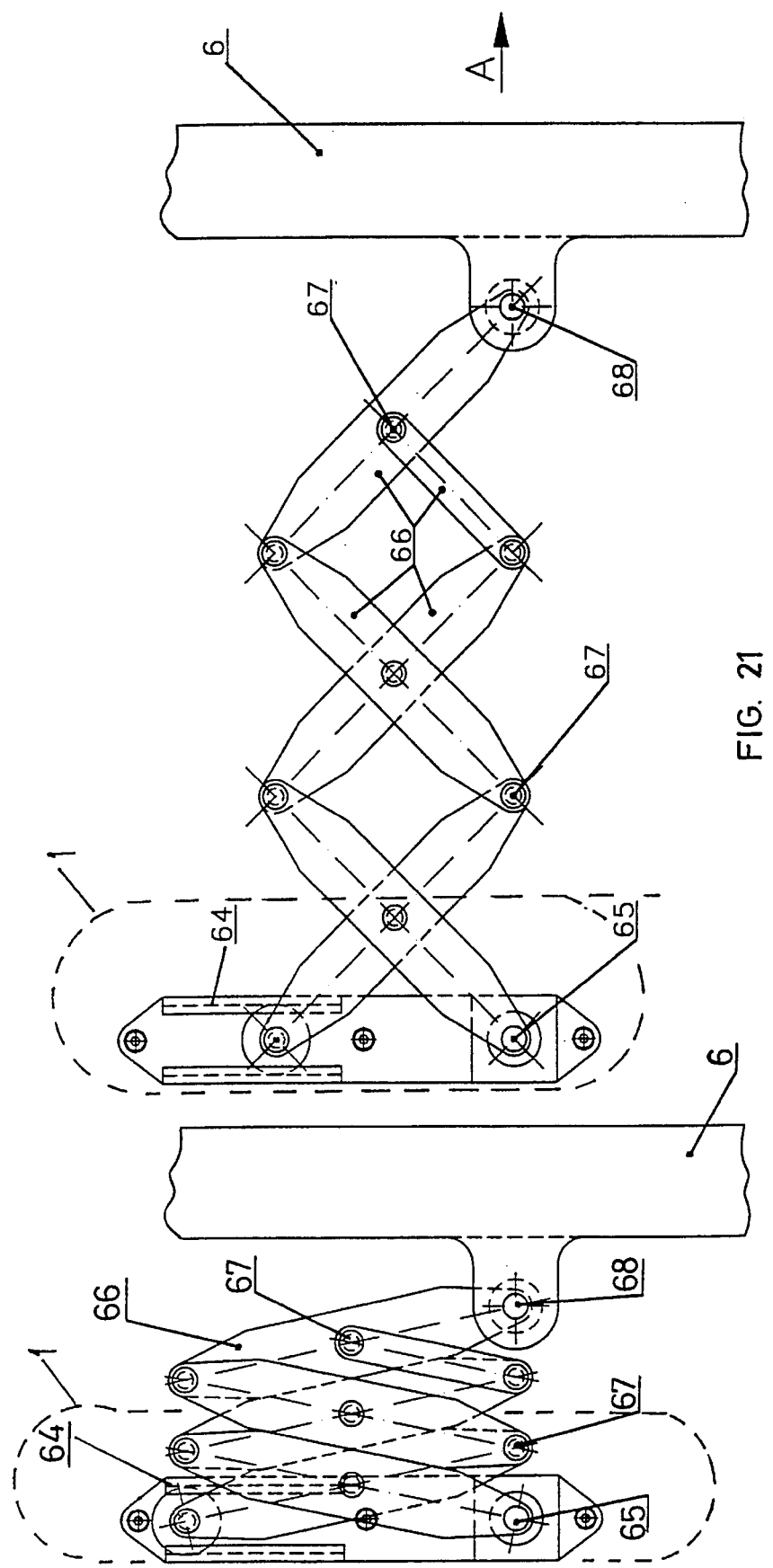

FIG. 21 shows a multiple scissors mechanism similar to the above, but with more than four bars.

Figure 22:
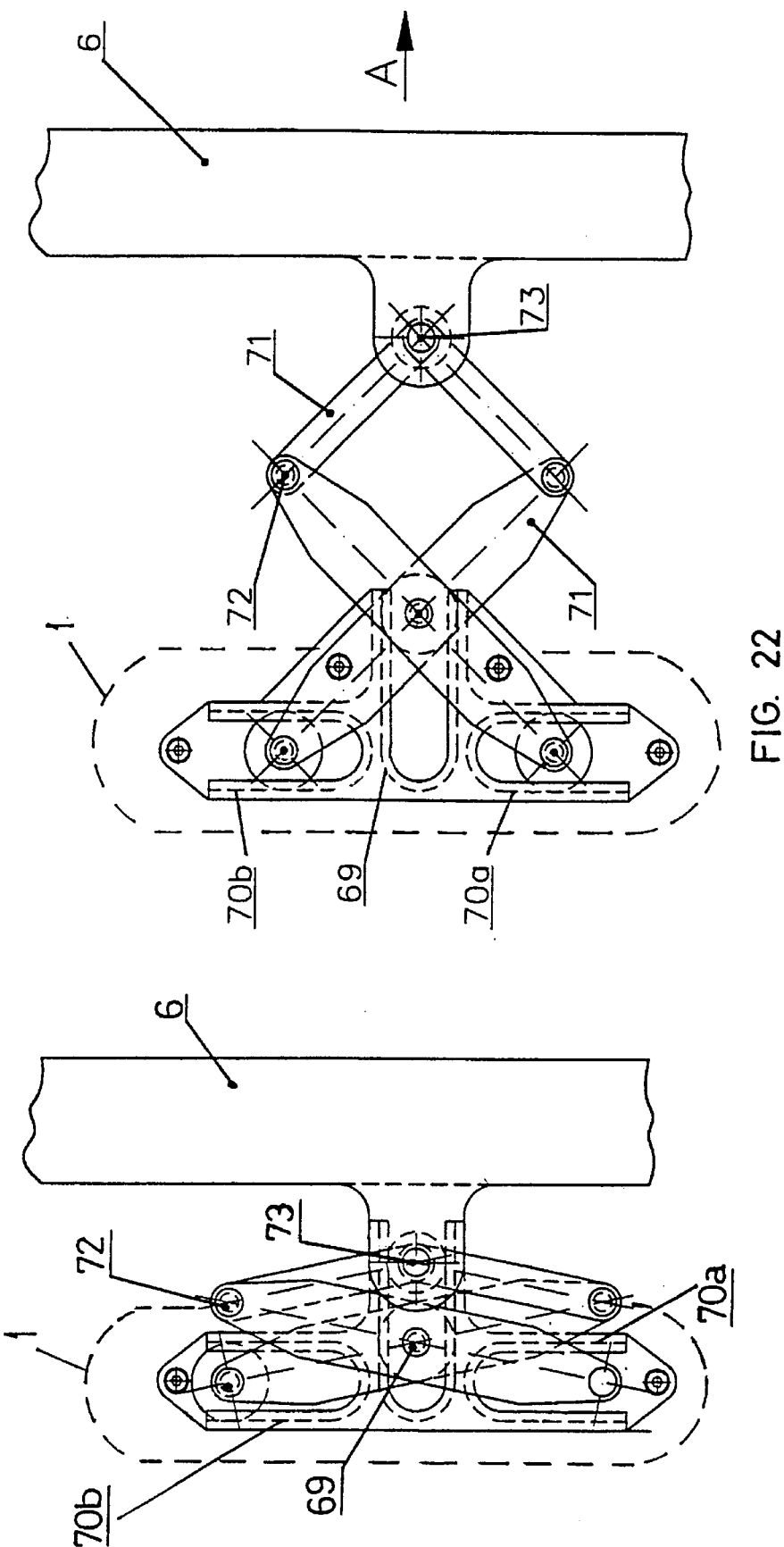

FIG. 22 shows a single scissors mechanism with three tracks, a central track 69 in a direction parallel to the longitudinal axis of the engine and two support tracks 70a and 70b aligned in the direction normal to the longitudinal axis 14 of the engine at the upstream end of said single scissors mechanism with three tracks, having four bars 71 with cylindrical articulations 72 at the articulations which interlink said bars and spherical knuckle at the tracks 70a and 70b located upstream and at the articulation 73 with the external ring segments 6a or 6b or with the join of both of them and the path of said articulation 73 passing via the central track of said mechanism and included within a plane which contains the longitudinal axis 14 of the engine.

Figure 23:
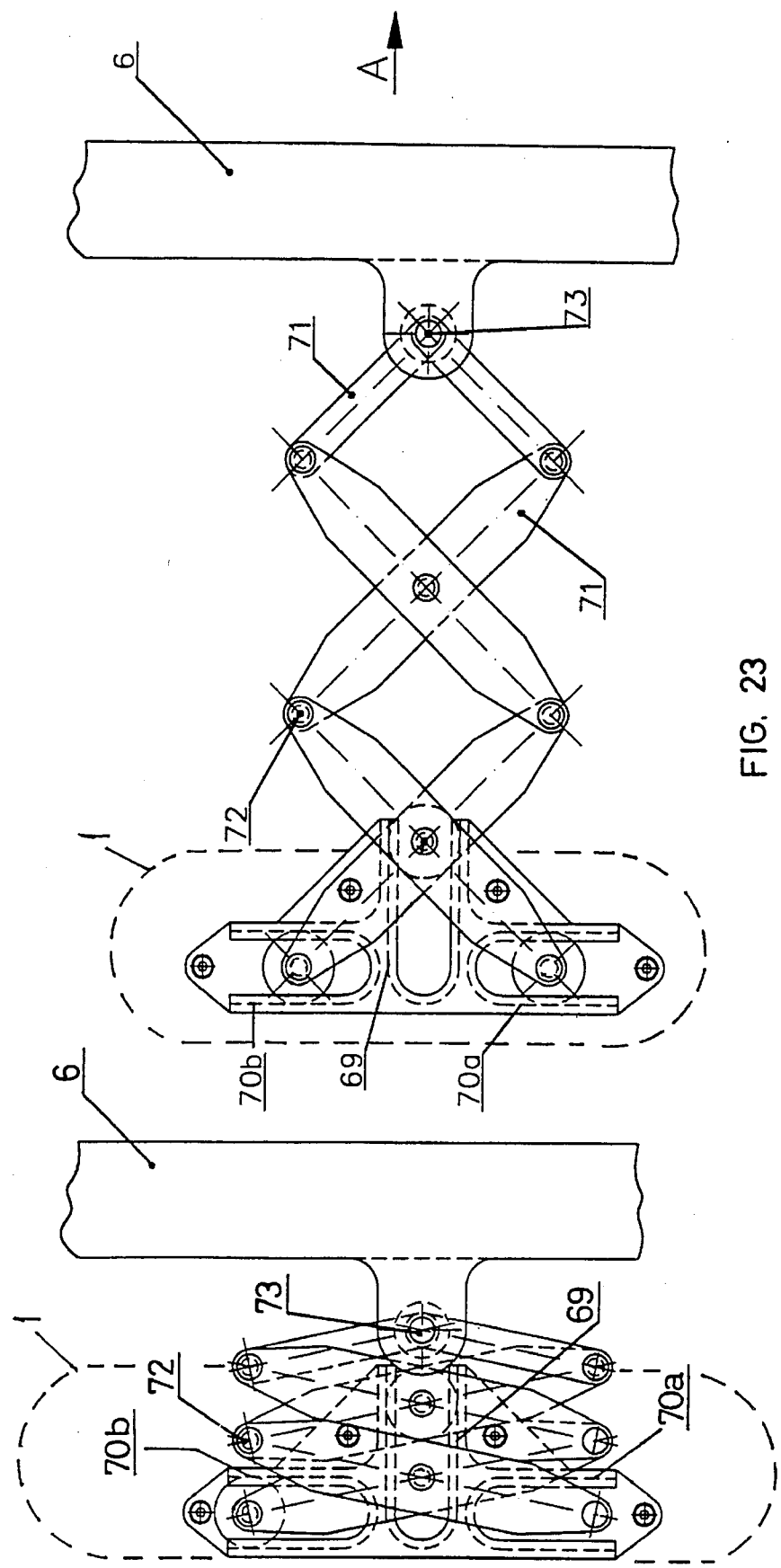

FIG. 23 shows a multiple scissors mechanism similar to the above but with four bars.

FIG. 24 shows a hinge mechanism having three leaves 74, 75a and 75b, also shown in FIGS. 1a, 3, 4 and 5, for housing an actuator 9 between two of said leaves 75a and 75b, said two leaves sharing, with the downstream end of said actuator, at their downstream ends, one and the same articulation 11 which gives the actuator two degrees of freedom in turning and gives one degree of freedom in turning to said downstream articulations of said two leaves and the trajectory of the downstream ends said two leaves coinciding with that of the actuator 9 and included within a plane which contains the longitudinal axis 14 of the engine.

FIGS. 25, 26, 27 and 28 show the perimetrical mechanism for centering each divergent secondary petal 34 with respect to its adjacent main petals 5, which consists of three tilted arms 76, 77a and 77b, which are interlinked, one of which turns with a cylindrical articulation 78 about a pivot 79 mounted in a direction normal to the surface of said divergent secondary petal 34 which is swept by the flow of gas, at a point of the longitudinal axis of symmetry of said divergent secondary petal, and each one of the other two tilted arms 77a and 77b of which turns in an identical manner with respect to a pivot 80 mounted in an identical manner on one of the two divergent main petals 5, and the interlinking of said tilted arms is achieved by the spherical knuckles 81.

FIGS. 29a and 29b show the conventional device for support of each convergent secondary petal 33 on its two adjacent convergent main petals 4, this being a simple rod 82 articulated cylindrically in its central part on a fixed fork 83 on the outer surface of said convergent secondary petal, and which has an improvement consisting in a longitudinal groove 84 which subdivides said central part into two arms to form a spring whose width exceeds the clear span left between the two lugs of said fork 83.

FIGS. 27 and 28 also show the device for support of each divergent secondary petal 34 on its two adjacent divergent main petals 5 which is located outside the outlet area A9, on two extensions 85 of the longitudinal sides of said divergent secondary petal 34, consisting of two horns 86 which, with their free ends facing upstream, are parallel to the longitudinal axis 14 of the engine and rest on the curved transverse edge 87 which each divergent main petal 5 has downstream, that is to say at A9.

FIG. 30 shows the embodiment in which half of the actuators 9 of the control system are located on axes parallel to the longitudinal axis 14 of the engine and normal to the circumference which defines the external ring segments 6*a* and 6*b*, at the same time as the other half is located in an identical manner on the circumference which defines the intermediate ring 7.

FIG. 31 shows the embodiment in which a third of the actuators 9 of the control system are located on axes parallel to the longitudinal axis 14 of the engine and normal to the circumference which defines the external ring segments 6*a* and 6*b*, at the same time as the remaining two thirds are located in an identical manner on the circumference which defines the intermediate ring 7.

what is claimed is:

1. A thrust vectoring variable geometry axisymmetric exhaust nozzle for a gas turbine engine having a direction of gas flow, which comprises:

a convergent zone defining a throat of variable are followed, in the direction of gas flow, by a divergent zone, the convergent zone including convergent main petals and convergent secondary petals supported on adjacent convergent main petals, the divergent zone including divergent main petals and divergent secondary petals supported on adjacent divergent main petals and connected to the adjacent divergent main petals by a centering mechanism, the petals of said convergent and divergent zones being distributed circumferentially about a longitudinal axis of the engine;

the convergent and divergent main petals are joined together by tangential cylindrical linkages having axes perpendicular to the longitudinal axis of the engine;

each divergent main petal is transversely subdivided into two segments, the upstream and the downstream segment, joined together by cylindrical linkages having an axis perpendicular to the tangential linkage between the convergent main petal and the divergent main petal;

control means for regulating the throat area and vectoring of the thrust comprising internal, intermediate and external rings concentric to each other and with the centerline of the engine, and a plurality of linear actuators having upstream and downstream ends, and a mechanism for regulating the throat area;

the main convergent petals being linked to the internal ring by cylindrical articulations;

a set of two-hinged bars, one for each divergent main petal, interconnecting the downstream segment of the divergent main petals with the external ring, a plurality of control actuators articulated at their upstream end to a fixed structure of the engine, some of the control actuators articulated at their downstream end to external ring spherical linkages and the other control actuators articulated at their downstream end to intermediate ring spherical linkages, thrust vectoring being achieved in the divergent zone by inclination of the external ring with a center of tilting on the longitudinal axis of the engine through the set of two-hinged bars;

each of the rings being independently connected to the fixed structure of the engine by support means, which do not interconnect them, maintaining each ring laterally fixed;

the external ring including two external ring segments which are mutually articulated by a pair of spindles for varying symmetrically, by a simultaneous and opposite direction tilting of the two external ring segments, the outlet area with respect to an immobilized throat area, and during vectorization of the gas flow, by an independent tilting of one of the two external ring segments, correcting the outlet area asymmetrically while the other external ring segment remains immobilized.

2. The nozzle as claimed in claim 1, wherein the internal and intermediate rings and the external ring segments are mutually connected by two pairs of spindles, one pair perpendicular to the other pair, and one of the pair of spindles connecting the intermediate ring to the internal ring, and the other pair of spindles connecting the intermediate ring to the articulated ends of the external ring segments, for being a single control system, in combination with the plurality of control actuators and the mechanism for regulating the throat area, in which the regulating of the throat area is achieved by axial displacement of the assembly of rings and external ring segments, and in which the symmetric variation of the outlet are with respect to an immobilized throat area is achieved by a simultaneous and opposite direction tilting of the two external ring segments, and in which the thrust vectoring is achieved by a simultaneous and same direction tilting of the two external ring segments with the centers of tilting on the longitudinal axis of the engine, and in which the asymmetric correction of the outlet area, during the vectorization of the gas flow, is achieved by an independent tilting of one of the two external ring segments, while the other external ring segment remains immobilized.

3. The nozzle as claimed in claim 1, wherein the internal and intermediate rings and the external mutually articulated ring segments are not interconnected, constituting, in combination with the plurality of control actuators and the mechanism for regulating the throat area, two control system, in which regulating the throat area is achieved by axial displacement of the intermediate ring only, and in which symmetric variation of the outlet area with respect to an immobilized throat area is achieved by a simultaneous and opposite direction tilting of the two external ring segments, and in which thrust vectoring is achieved by a simultaneous and same direction tilting of the two external ring segments with the center of tilting of the longitudinal axis of the engine, and in which the asymmetric correction of the outlet area, during vectorization of the gas flow, is achieved by an independent tilting of one of the two external ring segments, while the other external ring segment remains immobilized.

4. The nozzle as claimed in claim 1, wherein support means which connect the movable rings and external ring segments to fixed structure are of the tangential type, permitting the movement of rings and external ring segments.

5. The nozzle as claimed in claim 2, wherein each convergent main petal at its downstream end has a single link rod, a crank having two arms and a peripheral bar, said link rod being joined at its upstream end by a ball-and-socket joint to the downstream end of the fixed structure of the engine and at its downstream end to one of the arms of the crank, the crank is mounted in an articulated manner on a pivot which, forming an integral part of the convergent main petal, and has its axis perpendicular to the base of the convergent main petal, the other arm of the crank is connected by a ball-and-socket joint to one of the ends of the peripheral bar and the other end of the peripheral bar is joined by a ball-and-socket joint to the pivot of the adjacent convergent main petal, so that the assembly of cranks and peripheral bars of all the convergent main petals forms a peripheral mechanism for varying the throat area of the engine by the axial displacement of the assembly of the rings and ring segments.

6. The nozzle as claimed in claim 3, wherein each convergent main petal at its downstream end includes a single link rod, a crank having two arms and a peripheral bar, the link rod being joined at its upstream end by a ball-and-socket joint to the downstream end of the non-tilting intermediate ring and at its downstream end to one of the arms of the crank, the crank is mounted in an articulated manner on a pivot, which, forming an integral part of the convergent main petal, has its axis perpendicular to the base of the convergent main petal, and the other arm of the crank is connected by a ball-and-socket joint to one of the ends of the peripheral bar, the other end of the peripheral bar is joined by a ball-and-socket joint to the pivot of the adjacent convergent main petal, so that the assembly of cranks and peripheral bars of all the convergent main petals forms a peripheral mechanism for varying the throat area of the engine by the axial displacement of the non-tilting intermediate ring.

7. The nozzle as claimed in claim 4, wherein the support means of the movable rings includes at least three hinges having two leaves which are cylindrically interarticulated with a downstream leaf being cylindrically articulated on the ring and an upstream leaf being cylindrically articulated to the fixed structure of the engine.

8. The nozzle as claimed in claim 4, wherein the support means of the assembly of the external ring segments includes a planar system of articulated bars which do not limit the movement imposed by the plurality of actuators, each one of the planar system of articulated bars being linked in an articulated manner by its downstream end to the assembly of external ring segments and by its upstream end, in an articulated manner, to the fixed structure of the engine.

9. The nozzle as claimed in claim 8, wherein each of the support means of the external ring segments is a Desjonges mechanism which includes two bars interlinked by a cylindrical articulation, with a track in a direction normal to the longitudinal axis of the engine and aligned with the fixed articulated support member of the second bar on the upstream end of the mechanism, and with a spherical knuckle on the track and on the fixed support member of the second bar and on the articulation with the external ring segment, and a path of the latter articulation passing via the fixed articulation of the second bar and within a plane which contains the longitudinal axis of the engine.

10. The nozzle as claimed in claim 8, wherein each of the support means of the external ring segments is a Desjonges mechanism which includes two bars interlinked by means of cylindrical articulation, with a track in the direction normal to the longitudinal axis of the engine and aligned with the fixed articulated support member of the second bar on the upstream end of the mechanism, and with a spherical knuckle on the track and on the fixed support member of the second bar and on the articulation with the external ring segment, and a path of the latter articulation passing outside the fixed articulation of the second bar and within a plane which contains the longitudinal axis of the engine.

11. The nozzle as claimed in claim 8, wherein each of the support means of the external ring segments is an articulated Evans-Desjonges quadrilateral mechanism having a crank.

12. The nozzle as claimed in claim 8, wherein each of the support means of the external ring segments is a conchoidal mechanism which includes two bars which are interlinked by a cylindrical articulation, with a tilting track along one of the bars and being articulated at a fixed point aligned with the fixed articulated support member of the second bar perpendicularly to the longitudinal axis of the engine on the upstream end of the mechanism, and with a spherical knuckle on the fixed point of the track and on the fixed support member of the second bar and on the articulation with the external ring segment, and a path of the latter articulation passing via an intermediate point on the base of the conchoidal mechanism and within a plane which contains the longitudinal axis of the engine.

13. The nozzle as claimed in claim 8, wherein each of the support means of the external ring segments is a conchoidal mechanism which includes two bars which are interlinked by a cylindrical articulation, with a tilting track along one of the bars and being articulated at a fixed point aligned with the fixed articulated support member of the second bar perpendicular to the longitudinal axis of the engine on the upstream end of the mechanism, and with a spherical knuckle, on the fixed point of the track and on the fixed support member of the second bar and on the articulation with the external ring segment, and a path of the latter articulation passing via the fixed articulated support member of the second bar of the conchoidal mechanism and within a plane which contains the longitudinal axis of the engine.

14. The nozzle as claimed in claim 8, wherein each of the support means of the external ring segments is a conchoidal mechanism which consists of two bars which are interlinked by a cylindrical articulation, with a tilting track along one of the bars and being articulated at a fixed point aligned with the fixed articulated support member of the second bar perpendicular to the longitudinal axis of the engine on the upstream end of the mechanism, and with a spherical knuckle on the fixed point of the track and on the fixed support member of the second bar at the articulation with the external ring segment, and a path of the articulation passing outside the base of the conchoidal mechanism and within a plane which contains the longitudinal axis of the engine.

15. The nozzle as claimed in claim 8, wherein each of the support means of the external ring segments is a single scissors mechanism with a track in a direction normal to the longitudinal axis of the engine and aligned with a fixed articulated support member at the upstream end of the single scissors mechanism, the single scissors mechanism having four bars with cylindrical articulations which interlink the bars and spherical knuckles at the track and on the fixed support member and on the articulation with the external ring segments, and a path of the latter articulation passing via the fixed support member of the mechanism and included in a plane which contains the longitudinal axis of the engine.

16. The nozzle as claimed in claim 8, wherein each of the support means of the external ring segments is a multiple scissors mechanism with a track in the direction normal to the longitudinal axis of the engine and aligned with the fixed articulated support member at the upstream end of said multiple scissors mechanism, the multiple scissors mechanism having more than four bars with cylindrical articulations which interlink the bars and spherical knuckles at the track and on the fixed support member and on the articulation with the external ring segments, and a path of the latter articulation passing via the fixed support member of the mechanism and included in a plane which contains the longitudinal axis of the engine.

17. The nozzle as claimed in claim 8, wherein each of the support means of the external ring segments is a single scissors mechanism with three tracks, a central track in a direction parallel to the longitudinal axis of the engine and two support tracks aligned in a direction normal to the longitudinal axis of the engine at the upstream end of the single scissors mechanism, the single scissors mechanism having four bars with cylindrical articulations which interlink the bars and spherical knuckles at the tracks located upstream and at the articulation with the external ring segments, and a path of the latter articulation passing via the central track of the mechanism and within a plane which contains the longitudinal axis of the engine.

18. The nozzle as claimed in claim 8, wherein each of the support means of the external ring segments is a multiple scissors mechanism with three tracks, a central track in a direction parallel to the longitudinal axis of the engine and two support tracks aligned in a direction normal to the longitudinal axis of the engine at the upstream end of the multiple scissors mechanism, the multiple scissors mechanism having more than four bars with cylindrical articulations which interlink the bars and spherical knuckles at the tracks located upstream and at the articulation with the external ring segments, and a path of the latter articulation passing via the central track of the mechanism and included within a plane which contains the longitudinal axis of the engine.

19. The nozzle as claimed in claim 8, wherein each of the support means of the external ring segments is a hinge mechanism having three leaves for housing an actuator between two of the leaves, the two leaves at their downstream ends sharing with the downstream end of the actuator one and the same articulation which provides the actuator with two degrees of freedom in turning and one degree of freedom in turning to the downstream articulations of the two leaves, and a path of the downstream ends of the two leaves coinciding with that of the actuator and included within a plane which contains the longitudinal axis of the engine.

20. The nozzle as claimed in claim 18, wherein each track is a rolling track.

21. The nozzle as claimed in claim 17, wherein each track is a rolling track.

22. The nozzle as claimed in claim 16, wherein each track is a rolling track.

23. The nozzle as claimed in claim 15, wherein each track is a rolling track.

24. The nozzle as claimed in claim 14, wherein each track is a rolling track.

25. The nozzle as claimed in claim 13, wherein each track is a rolling track.

26. The nozzle as claimed in claim 12, wherein each track is a rolling track.

27. The nozzle as claimed in claim 11, wherein each track is a rolling track.

28. The nozzle as claimed in claim 10, wherein each track is a rolling track.

29. The nozzle as claimed in claim 9, wherein each track is a rolling track.

30. The nozzle as claimed in claim 1, wherein a perimetrical mechanism for centering each divergent secondary petal with respect to the adjacent main divergent petals includes three interlinked tilted arms, one of the tilted arms turns with a cylindrical articulation about a pivot mounted in a direction normal to the surface of the secondary petal, and each of the other two tilted arms turns about a pivot mounted in an identical manner with respect to a pivot mounted on one of the two divergent main petals, and an interlinking of the tilted arms is achieved by spherical knuckles.

31. The nozzle as claimed in claim 1, wherein the support of each divergent secondary petal on the adjacent divergent main petals includes an assembly of two different devices, one of the devices includes the peripheral mechanism for centering each divergent secondary petal, whose tilted arms have flexural rigidity in a plane normal to the longitudinal axis of the engine and the other of the devices which, being located outside the outlet area of the engine on two extensions of the longitudinal sides of the divergent secondary petal, includes two horns which, with their free ends facing upstream, are parallel to the longitudinal axis of the engine and rest on the curved transverse edge-of a divergent main petal.

32. The nozzle as claimed in claim 1, in which a conventional device for support of the downstream end of each convergent secondary petal on its respective two adjacent convergent main petals includes a single rod articulated in a cylindrical manner in its central part on a fork fixed on the outer surface of the convergent secondary petal, wherein the single rod has a longitudinal groove which sub-divides the central part into two arms where are a spring, the width of which exceeds the span left between the two lugs of the fork.

33. The nozzle as claimed in claim 1, wherein a crank having two arms is among the elements for varying the throat area of the engine and has a lateral groove for permitting mounting of an articulated end of a peripheral bar on a pivot of the convergent main petal, the lateral groove is closed with a bolt once the mounting operation is complete.

34. The nozzle as claimed in claim 1, wherein half of the actuators of the control system are located on axes parallel to the longitudinal axis of the engine and normal to a circumference which defines the external ring segments and the other half of the actuators are located in an identical manner on a circumference which defines the intermediate ring.

35. The nozzle as claimed in claim 1, wherein, one third of the actuators of the control system are located on axes parallel to the longitudinal axis of the engine and normal to a circumference which defines the external ring segments, a remaining two thirds of the actuators are located in an identical manner on a circumference which defines the intermediate ring.

\* \* \* \* \*